US010924232B2

(12) United States Patent
Cezanne et al.

(10) Patent No.: US 10,924,232 B2
(45) Date of Patent: Feb. 16, 2021

(54) BEAM REFERENCE SIGNAL FOR BROADCAST DECODING

(71) Applicant: QUALCOMM Incorporated, San Diego, CA (US)

(72) Inventors: Juergen Cezanne, Ocean Township, NJ (US); Sundar Subramanian, Bridgewater, NJ (US); Muhammad Nazmul Islam, Edison, NJ (US); Bilal Sadiq, Basking Ridge, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/357,055

(22) Filed: Nov. 21, 2016

(65) Prior Publication Data

US 2017/0288831 A1    Oct. 5, 2017

Related U.S. Application Data

(60) Provisional application No. 62/315,666, filed on Mar. 30, 2016.

(51) Int. Cl.
*H04W 56/00* (2009.01)
*H04W 72/04* (2009.01)
(Continued)

(52) U.S. Cl.
CPC ......... *H04L 5/0048* (2013.01); *H04B 7/0617* (2013.01); *H04L 25/0202* (2013.01);
(Continued)

(58) Field of Classification Search
None
See application file for complete search history.

(56) References Cited

U.S. PATENT DOCUMENTS

2014/0086173 A1    3/2014  Sadeghi et al.
2014/0204851 A1    7/2014  Chen et al.
(Continued)

FOREIGN PATENT DOCUMENTS

WO    WO-2017135995 A1    8/2017

OTHER PUBLICATIONS

Erik D. et al., "Section 10.2.2," In: "4G: LTE/LTE-Advanced for Mobile Broadband," Jul. 10, 2013, pp. 175-179, XP055376471, Elsevier Science.
(Continued)

*Primary Examiner* — Ayaz R Sheikh
*Assistant Examiner* — Sori A Aga
(74) *Attorney, Agent, or Firm* — Holland & Hart LLP/Qualcomm Incorporated

(57) ABSTRACT

Methods, systems, and devices for wireless communication are described. A base station may transmit a subframe that includes physical broadcast channel (PBCH) signals interspersed within beam reference signals, where the subframe may be a synchronization subframe including one or more synchronization signals. In some cases, the beam reference signals from different antenna ports may be code division multiplexed or frequency division multiplexed over multiple frequency tones. A user equipment (UE) may use the beam reference signals to generate channel estimates for the PBCH signals. In some cases, orthogonal cover codes for code division multiplexed signals may be selected to facilitate generation of channel estimates for PBCH signals transmitted using nearby frequency tones.

66 Claims, 18 Drawing Sheets

(51) Int. Cl.
| | |
|---|---|
| *H04L 5/00* | (2006.01) |
| *H04B 7/06* | (2006.01) |
| *H04L 27/26* | (2006.01) |
| *H04L 25/02* | (2006.01) |
| *H04W 72/00* | (2009.01) |

(52) U.S. Cl.
CPC ....... *H04L 27/2613* (2013.01); *H04W 56/001* (2013.01); *H04W 72/005* (2013.01); *H04W 72/046* (2013.01); *H04W 72/0453* (2013.01); *H04W 72/0466* (2013.01); *H04L 5/0053* (2013.01); *H04L 27/2692* (2013.01)

(56) References Cited

U.S. PATENT DOCUMENTS

| | | | | |
|---|---|---|---|---|
| 2015/0085838 | A1* | 3/2015 | Benjebbour | H04W 16/28 370/336 |
| 2015/0341908 | A1* | 11/2015 | Wang | H04W 72/02 370/312 |
| 2015/0358064 | A1* | 12/2015 | Benjebbour | H04B 7/0452 370/329 |
| 2017/0034812 | A1* | 2/2017 | Deng | H04W 72/046 |
| 2018/0048413 | A1* | 2/2018 | Liu | H04J 11/0069 |
| 2018/0375707 | A1* | 12/2018 | Bala | H04L 27/2627 |
| 2019/0081688 | A1* | 3/2019 | Deenoo | H04B 7/0695 |

OTHER PUBLICATIONS

ISA/EP, International Search Report and Written Opinion of the International Searching Authority, Int'l Application No. PCT/US2017/024660, dated Jun. 7, 2017, European Patent Office, Rijswijk, NL, 20 pgs.

Qualcomm Europe, "Link Analyses of Different Reference Signal Designs for Dual-Stream Beamforming," 3GPP TSG-RAN WG1 Meeting #56bis, R1-091448, Seoul, South Korea, Mar. 23-27, 2009, 9 pgs., 3rd Generation Partnership Project.

Ericsson, et al., "Further Considerations on Rel-9 Dual Layer OM RS Design", 3GPP TSG-RAN WG1 #58bis, 3GPP Draft; R1-094263, 3rd Generation Partnership Project (3GPP), Mobile Competence Centre; 650, Route Des Lucioles; F-06921 Sophia-Antipolis Cedex; France, No. Miyazaki; Oct. 12, 2009, Oct. 12, 2009 (Oct. 12, 2009), 8 Pages, XP050388726, Oct. 12, 2009-Oct. 16, 2009 [retrieved on Oct. 17, 2009].

Fujitsu: "DL Reference Signal Design for 8×8 MIMO in LTE-Advanced", 3GPP TSG-RAN1 #56, 3GPP Draft; R1-090706, 3rd Generation Partnership Project (3GPP), Mobile Competence Centre; 650, Route Des Lucioles; F-06921 Sophia-Antipolis Cedex; France, No. Athens, Greece; Feb. 3, 2009, Feb. 3, 2009 (Feb. 3, 2009), pp. 1-12, XP050318576, Feb. 9, 2009-Feb. 13, 2009 [retrieved on Feb. 3, 2009].

* cited by examiner

BEAM REFERENCE SIGNAL FOR BROADCAST DECODING

CROSS REFERENCES

The present Application for Patent claims priority to U.S. Provisional Patent Application No. 62/315,666 by Cezanne, et al., entitled "Beam Reference Signal For Broadcast Decoding," filed Mar. 30, 2016, assigned to the assignee hereof, and is hereby expressly incorporated by reference herein in its entirety.

BACKGROUND

The following relates generally to wireless communication, and more specifically to beam reference signal for broadcast decoding.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a wireless network may operate in millimeter wave (mmW) spectrum. Using mmW spectrum may result in additional path loss which will impact the link budget of the communications. In some cases, wireless devices operating in mmW spectrum may utilize beamforming to increase the strength of wireless signals. However, using beamforming techniques may interfere with broadcast signals from a base station. For example, this may prevent UEs that are not in the path of the beamformed signal from receiving system information to be used for system access.

SUMMARY

A base station may transmit a subframe that includes physical broadcast channel (PBCH) signals interspersed within beamforming reference signals. In some cases, the beamforming reference signals from different antenna ports may be code division multiplexed or frequency division multiplexed over multiple frequency tones. A user equipment (UE) may use the beamforming reference signals to generate channel estimates for the PBCH signals. In some cases, orthogonal cover codes for code division multiplexed signals may be selected to facilitate generation of channel estimates for PBCH signals transmitted using nearby frequency tones.

A method of wireless communication is described. The method may include receiving a subframe comprising one or more beam reference signals and one or more PBCH signals, determining one or more channel estimates based at least in part on the one or more beam reference signals, and decoding one or more PBCH signals based at least in part on the one or more channel estimates.

An apparatus for wireless communication is described. The apparatus may include means for receiving a subframe comprising one or more beam reference signals and one or more PBCH signals, means for determining one or more channel estimates based at least in part on the one or more beam reference signals, and means for decoding one or more PBCH signals based at least in part on the one or more channel estimates.

Another apparatus for wireless communication is described. The apparatus may include a processor, memory in electronic communication with the processor, and instructions stored in the memory. The instructions may be operable to cause the processor to receive a subframe comprising one or more beam reference signals and one or more PBCH signals, determine one or more channel estimates based at least in part on the one or more beam reference signals, and decode one or more PBCH signals based at least in part on the one or more channel estimates.

A non-transitory computer readable medium for wireless communication is described. The non-transitory computer-readable medium may include instructions operable to cause a processor to receive a subframe comprising one or more beam reference signals and one or more PBCH signals, determine one or more channel estimates based at least in part on the one or more beam reference signals, and decode one or more PBCH signals based at least in part on the one or more channel estimates.

In some examples of the method, apparatus, and non-transitory computer-readable medium described above, the subframe may be a synchronization subframe comprising one or more synchronization signals. In some examples of the method, apparatus, and non-transitory computer-readable medium described above, the one or more synchronization signals comprise a primary synchronization signal, a secondary synchronization signal, an extended synchronization signal, or any combination thereof.

In some examples of the method, apparatus, and non-transitory computer-readable medium described above, each of the one or more beam reference signals comprise a set of signals corresponding to a set of antenna ports. In some examples of the method, apparatus, and non-transitory computer-readable medium described above, the one or more PBCH signals comprise a plurality of PBCH signals that may be spatially multiplexed from each antenna port across a same set of resource elements.

In some examples of the method, apparatus, and non-transitory computer-readable medium described above, the one or more beam reference signals may be code division multiplexed using a set of orthogonal cover codes over a set of frequency tones, wherein each of the set of orthogonal cover codes may be associated with an antenna port of the set of antenna ports. In some examples of the method, apparatus, and non-transitory computer-readable medium described above, the set of orthogonal cover codes may be based at least in part on a Hadamard matrix or a DFT matrix.

Some examples of the method, apparatus, and non-transitory computer-readable medium described above may further include processes, features, means, or instructions for identifying a reference frequency tone of the set of frequency tones, wherein the set of orthogonal cover codes comprises a weight value of one for each of the set of antenna ports over the reference frequency tone, and wherein the one or more channel estimates may be based at least in part on identifying the reference frequency tone. Some examples of the method, apparatus, and non-transitory computer-readable medium described above may further include processes, features, means, or instructions for identifying an additional reference frequency tone of the set of frequency tones, wherein the set of orthogonal cover codes comprises a weight value of one for a first half of the set of antenna ports and a weight value of negative one for a second half of the set of antenna ports over the additional reference frequency tone, and wherein the one or more channel estimates may be based at least in part on identifying the additional reference frequency tone.

In some examples of the method, apparatus, and non-transitory computer-readable medium described above, the reference frequency tone and the additional reference frequency tone may be middle tones of the set of frequency tones. In some examples of the method, apparatus, and non-transitory computer-readable medium described above, a horizontal polarization, a vertical polarization, or both for each of the set of antenna ports may be associated with a transmission direction.

In some examples of the method, apparatus, and non-transitory computer-readable medium described above, the set of antenna ports comprises a set of antenna port pairs, and wherein each of the set of antenna port pairs may be associated with a transmission direction. In some examples of the method, apparatus, and non-transitory computer-readable medium described above, the one or more beam reference signals may be frequency division multiplexed over a set of frequency tones. In some examples of the method, apparatus, and non-transitory computer-readable medium described above, the one or more PBCH signals may be pre-coded using space frequency block coding.

In some examples of the method, apparatus, and non-transitory computer-readable medium described above, the one or more channel estimates comprises a plurality of frequency specific channel estimates. In some examples of the method, apparatus, and non-transitory computer-readable medium described above, the subframe may be received using a millimeter wave (mmW) band. Some examples of the method, apparatus, and non-transitory computer-readable medium described above may further include processes, features, means, or instructions for performing an access procedure for a wireless network based at least in part on decoding the one or more PBCH signals.

A method of wireless communication is described. The method may include transmitting a subframe comprising one or more beam reference signals and one or more physical broadcast channel (PBCH) signals, wherein the one or more beam reference signals are configured to be used as a basis for one or more channel estimates for decoding one or more PBCH signals.

An apparatus for wireless communication is described. The apparatus may include means for transmitting a subframe comprising one or more beam reference signals and one or more PBCH signals, wherein the one or more beam reference signals are configured to be used as a basis for one or more channel estimates for decoding one or more PBCH signals.

Another apparatus for wireless communication is described. The apparatus may include a processor, memory in electronic communication with the processor, and instructions stored in the memory. The instructions may be operable to cause the processor to transmit a subframe comprising one or more beam reference signals and one or more PBCH signals, wherein the one or more beam reference signals are configured to be used as a basis for one or more channel estimates for decoding one or more PBCH signals.

A non-transitory computer readable medium for wireless communication is described. The non-transitory computer-readable medium may include instructions operable to cause a processor to transmit a subframe comprising one or more beam reference signals and one or more PBCH signals, wherein the one or more beam reference signals are configured to be used as a basis for one or more channel estimates for decoding one or more PBCH signals.

In some examples of the method, apparatus, and non-transitory computer-readable medium described above, the subframe may be a synchronization subframe comprising one or more synchronization signals. In some examples of the method, apparatus, and non-transitory computer-readable medium described above, each of the one or more beam reference signals comprise a set of signals corresponding to a set of antenna ports. In some examples of the method, apparatus, and non-transitory computer-readable medium described above, the one or more beam reference signals may be code division multiplexed using a set of orthogonal cover codes over a set of frequency tones.

Some examples of the method, apparatus, and non-transitory computer-readable medium described above may further include processes, features, means, or instructions for identifying a reference frequency tone of the set of frequency tones, wherein the set of orthogonal cover codes comprise a weight value of one for each of the set of antenna ports over the reference frequency tone, wherein the one or more channel estimates may be based at least in part on the reference frequency tone. Some examples of the method, apparatus, and non-transitory computer-readable medium described above may further include processes, features, means, or instructions for identifying an additional reference frequency tone of the set of frequency tones, wherein the set of orthogonal cover codes comprise a weight value of one for a first half of the set of antenna ports and a weight value of negative one for a second half of the set of antenna ports over the additional reference frequency tone, and wherein the one or more channel estimates may be based at least in part on the additional reference frequency tone.

In some examples of the method, apparatus, and non-transitory computer-readable medium described above, the reference frequency tone and the additional reference frequency tone may be middle tones of the set of frequency tones. In some examples of the method, apparatus, and non-transitory computer-readable medium described above, the set of antenna ports comprises a set of antenna port pairs, and wherein each of the set of antenna port pairs may be associated with a transmission direction. In some examples of the method, apparatus, and non-transitory computer-readable medium described above, the one or more beam reference signals may be frequency division multiplexed over a set of frequency tones.

DETAILED DESCRIPTION

Figure 1:
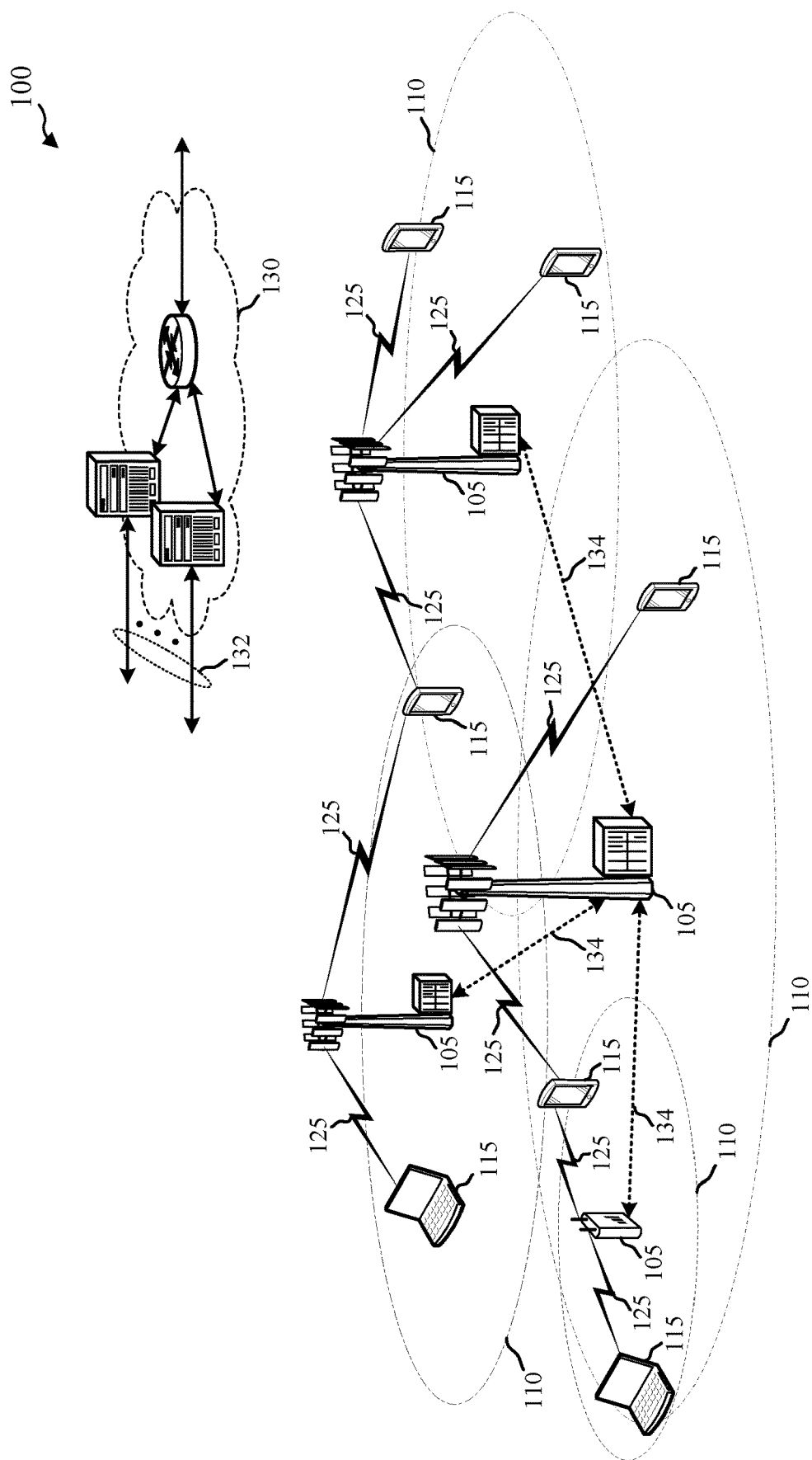
FIG. 1 illustrates an example of a wireless communications system that supports beam reference signals for broadcast decoding in accordance with various aspects of the present disclosure.

A base station may transmit a subframe (e.g., a synchronization subframe including one or more synchronization signals) that includes physical broadcast channel (PBCH) signals interspersed within beam reference signals. In some cases, beam reference signals from different antenna ports may be code division multiplexed or frequency division multiplexed over multiple frequency tones. A user equipment (UE) may use the beam reference signals to generate channel estimates for the PBCH signals. In some cases, orthogonal cover codes for code division multiplexed signals may be selected to facilitate generation of channel estimates for PBCH signals transmitted using nearby frequency tones.

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

The transmission of synchronization signals by a base station (e.g., including primary synchronization signals (PSSs), secondary synchronization signals (SSSs), or extended synchronization signals (ESSs)) may be used by a user equipment (UE) to synchronize its timing with a base station. In communications systems using mmW frequency ranges, synchronization signals may be beam-formed to meet a certain link budget (e.g., an accounting of gains and losses associated with transmitters and receivers when communicating over a medium). In such cases, base stations may use several antenna ports (e.g., 1, 2, 4, or 8 antenna ports) connected to subarrays of antennas to form beams in various directions using a number of analog weight factors.

During a synchronization period (i.e., a duration of synchronization signal transmissions), a base station may transmit on all of its antenna ports for several symbols. The beam sweeping during the synchronization period may also be used to deliver a broadcast signal, such as a PBCH signal. In some cases, synchronization signals may contain multiple beam references signals that correspond to each antenna port. The beam reference signals may allow a UE to measure a received signal strength indicator (RSSI) and the frequency selectivity of each beam, and thus allow the UE to identify a radio channel along which the beam travels from the base station.

In some examples, a base station may assign beam reference signals to different (or disjoint) sets of subcarriers to enable a UE to distinguish between the beam reference signals associated with different antenna ports. Additionally or alternatively, each antenna port may transmit a broadcast signal using a set of subcarriers different from those associated with the beam reference signals, where each antenna port may transmit the broadcast signal in the same set of subcarriers.

Some wireless communications systems may reuse a beam reference signal for obtaining channel estimates which may then be used for decoding PBCH signals. This may make the subcarrier spacing of the beam reference signal small enough so that each channel of each antenna port may be sampled at a specific sampling rate in the frequency domain. The beam reference signal tones may thus comprehensively characterize the channel used by each antenna port.

Aspects of the disclosure are initially described in the context of a wireless communication system. Further examples are then described of transmissions that allow efficient decoding of a PBCH signal using a beam reference signal. Aspects of the disclosure are further illustrated by and described with reference to apparatus diagrams, system diagrams, and flowcharts that relate to beam reference signals for broadcast decoding.

FIG. 1 illustrates an example of a wireless communications system 100 that supports beam reference signals for broadcast decoding in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support communication using mmW frequency ranges using beamforming techniques and subframes (e.g., synchronization subframes) designed such that beamforming reference signals may be used to generate channel estimates.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Wireless communications system 100 may operate using an ultra-high frequency (UHF) range using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

Wireless communications system 100 may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

Transmission of synchronization signals by a base station (e.g., including PSSs, SSSs and ESSs) may be used by a UE 115 to synchronize its timing to a base station 105. In communications systems using mmW frequency ranges, synchronization signals may be beam-formed to meet a certain link budget (e.g., an accounting of gains and losses associated with transmitters and receivers when communicating over a medium). In such cases, base stations 105 may use several antenna ports connected to subarrays of antennas to form the beams in various directions using a number of analog weight factors. Transmitted beams may then be swept over an entire sector to reach every UE 115 in a geographic coverage area 110.

During a synchronization period (i.e., a duration of synchronization signal transmissions), a base station 105 may transmit on all of its antenna ports for several symbols. For example, the synchronization period may last for 14 symbols of a subframe, and a beam direction of each antenna port may change from symbol to symbol. Thus, beams from all base station antenna ports may cover all relevant spatial directions of a cell during the transmission of synchronization signal. Beam sweeping during the synchronization period may also be used to deliver a broadcast signal, such as a PBCH signal. In some cases, PSS, SSS, and PBCH signals may be multiplexed in a transmission, such as a synchronization transmission, using frequency division multiplexing (FDM).

In some cases, synchronization signals may contain multiple beam reference signals that correspond to each antenna port. The beam reference signals may allow a UE 115 to measure a RSSI and the frequency selectivity of each beam, and thus allow the UE 115 to identify a radio channel along which the beam travels from the base station 105. As an example, a base station 105 may assign beam reference signals to different (or disjoint) sets of subcarriers to enable a UE 115 to distinguish between the beam reference signals associated with different antenna ports. Additionally or alternatively, each antenna port may transmit a broadcast signal using a set of subcarriers different from those associated with beam reference signals, where each antenna port may transmit the broadcast signal in the same set of subcarriers.

Figure 2:
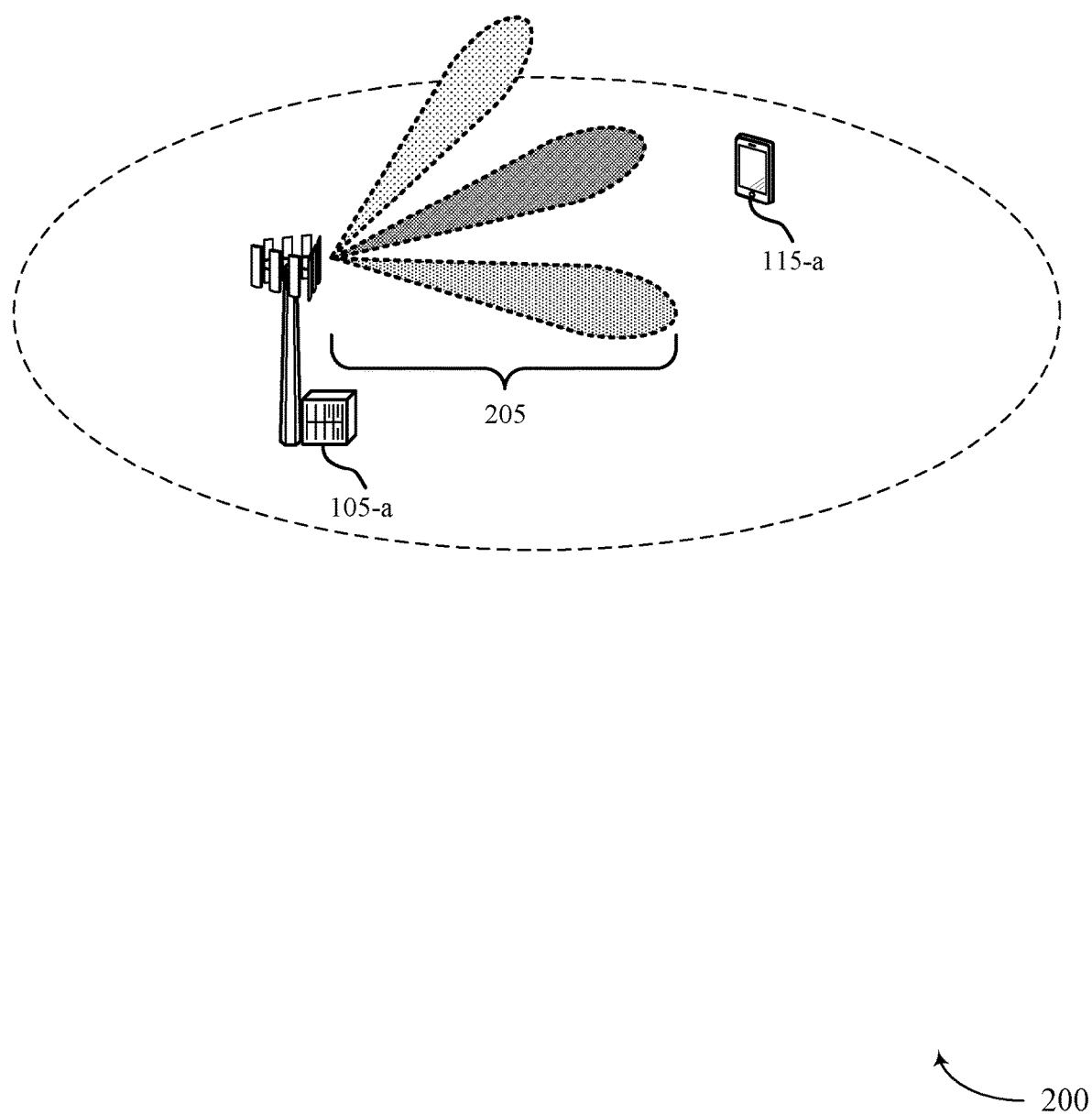
FIG. 2 illustrates an example of a wireless communications system that supports beam reference signals for broadcast decoding in accordance with various aspects of the present disclosure.

FIG. 2 illustrates an example of a wireless communications system 200 that supports beam reference signals for broadcast decoding. Wireless communications system 200 may include base station 105-*a* and UE 115-*a*, which may be examples of the corresponding devices described with reference to FIG. 1. Wireless communications system 200 may represent an example of the use of a beam reference signal to efficiently decode broadcast signals.

Wireless communications system 200 may reuse a beam reference signal to decode a PBCH signal, and thus reduce subcarrier overhead for broadcast signal decoding. That is, UE 115-*a* may receive beamformed transmission 205 from base station 105-*a*, and UE 115-*a* may then use one or more beam reference signals within a subframe (e.g., a synchronization subframe) of beamformed transmission 205 to form a channel estimate. The channel estimate may subsequently be used to decode a PBCH signal. This in turn may enable a subcarrier spacing of the beam reference signal small enough so that each channel of each antenna port may be sampled (e.g., sampled at the Nyquist rate) in the frequency domain. As a result, the beam reference signal tones may comprehensively characterize the channel used by each antenna port.

In some cases, a variable $N_{max}$ may represent a maximum number of antenna ports base station 105-*a* has. Additionally, $N_p$ may represent a number of antenna ports base station 105-*a* is using, and $N_B$ represents a number of subcarriers used for a broadcast signal, where it may be assumed that $N_{max}$ is divisible by $N_p$. That is, when $N_{max}$ is equal to 8, $N_p$ may be equal to 1, 2, 4, or 8. In some cases, a number of available subcarriers may be divided into sections of $N=N_{max}+N_B+1$ subcarriers. Each antenna port of base station 105-*a* may transmit a beam reference signal in the first $N_{max}$ subcarriers, where code division multiplexing (CDM) may be used to distinguish the beam reference signal contribution from each antenna port. Additionally or alternatively, the beam reference signals for respective antenna ports may be code multiplexed or frequency multiplexed on each subcarrier.

Each subcarrier k of any subcarrier section may be enumerated by k=0, 1, . . . N−1. CDM may also be described by weighting coefficients, $w_{pk}$, associated with antenna port p for the k-th subcarrier. Furthermore, the weighting coefficients may be chosen such that: $|w_{pk}|=1$, $w_{pk}$ represent entries of a unitary matrix W (multiplied by $N_p$), and $w_{p0}=1$ for all p.

In some cases, possible choices for W may be based on a type of matrix. For example, an orthogonal cover code may be based on a Hadamard matrix or discrete Fourier transform (DFT) matrix of dimension $N_p$. The orthogonal cover code may be chosen such that, for a number of subcarriers (e.g., two subcarriers), the corresponding antenna ports may be weighted by a specific value (e.g., weighted by 1). In some cases, a channel estimate derived from a beam reference signal may use grouped PBCH subcarriers. The subcarriers may be used to determine the channel estimate to decode a PBCH signal (e.g., the subcarriers may serve as a demodulation reference signal (DM-RS) for decoding PBCH signals). In some examples, each PBCH signal may be surrounded by two beam reference signal subcarriers used for decoding. Additionally or alternatively, the subcarriers used for decoding may be located elsewhere in a subframe (e.g., in the middle of a number of beam reference signal sub carriers).

Due to the condition that $w_{p0}=1$ for all p described above, the contents of a subcarrier enumerated by k=0 may also be used for decoding a PBCH signal. For subcarrier $k=N_{max}$, the same contents may be chosen as for subcarrier k=0 to obtain an additional subcarrier used for decoding of the PBCH signal. In some cases, the final $N_B$ subcarriers ($k=N_{max}+1 \ldots N-1$) may contain a portion of the overall broadcast signal. These sections may be repeated in the frequency domain and a broadcast portion may be surrounded by two beam reference signal subcarriers used to decode PBCH signals.

In some cases, an effective tone spacing of each antenna port used for beam reference signal transmissions may be equal to N. In one example where numerology is proportional to a bandwidth of 20 MHz, a spacing of N=12 may satisfy a Nyquist rate criterion. In other examples, an effective tone spacing may be equal to or greater than 16. A location of two beam reference signal subcarriers used for PBCH signal decoding may be independent of the number of antenna ports that are used ($N_p$). Therefore, UE 115-a may decode a broadcast signal without knowledge of $N_p$. Additionally or alternatively, a broadcast signal may contain $N_p$, and after decoding the broadcast signal, UE 115-a knows $N_p$ and may compute channel estimates for each of the $N_p$ antenna ports.

In some cases, all antenna ports may use the same power for each subcarrier. However, use of beam reference signals to decode PBCH signals may be modified to accommodate antenna ports using different powers for each subcarrier. For example, a subcarrier $k=N_{max}$ may be excluded from the subcarrier section, and the amplitude of the contents of the subcarrier k=0 may be increased by a scaling factor (e.g., a scaling factor of $\sqrt{2}$). Any other scaling factor may be similarly used to raise a signal-to-noise ratio (SNR) of the channel estimate for a broadcast signal. Raising the amplitude may dedicate a larger portion of a transmit power budget to the subcarrier bearing the beam reference signal used for decoding, and as a result, other beam reference signal subcarriers may be transmitted using less power. Thus, there may be a trade-off between quality of the beam reference signal channel estimate and the broadcast channel estimate. Additionally, dropping the subcarrier $k=N_{max}$ may reduce the effective tone spacing by 1 to $N=N_{max}+N_B$.

Through the use of beam reference signals to decode PBCH signals, improved channel estimates may be obtained for individual antenna ports with little to no gaps within groups of resource blocks (e.g., gaps between an upper and lower 41 resource blocks). Additionally or alternatively, an associated time domain channel impulse response may allow for interference estimation. In some cases, the use of beam reference signals to decode PBCH signals may be generalized to 1, 2, or 4 antenna ports.

Figure 3:
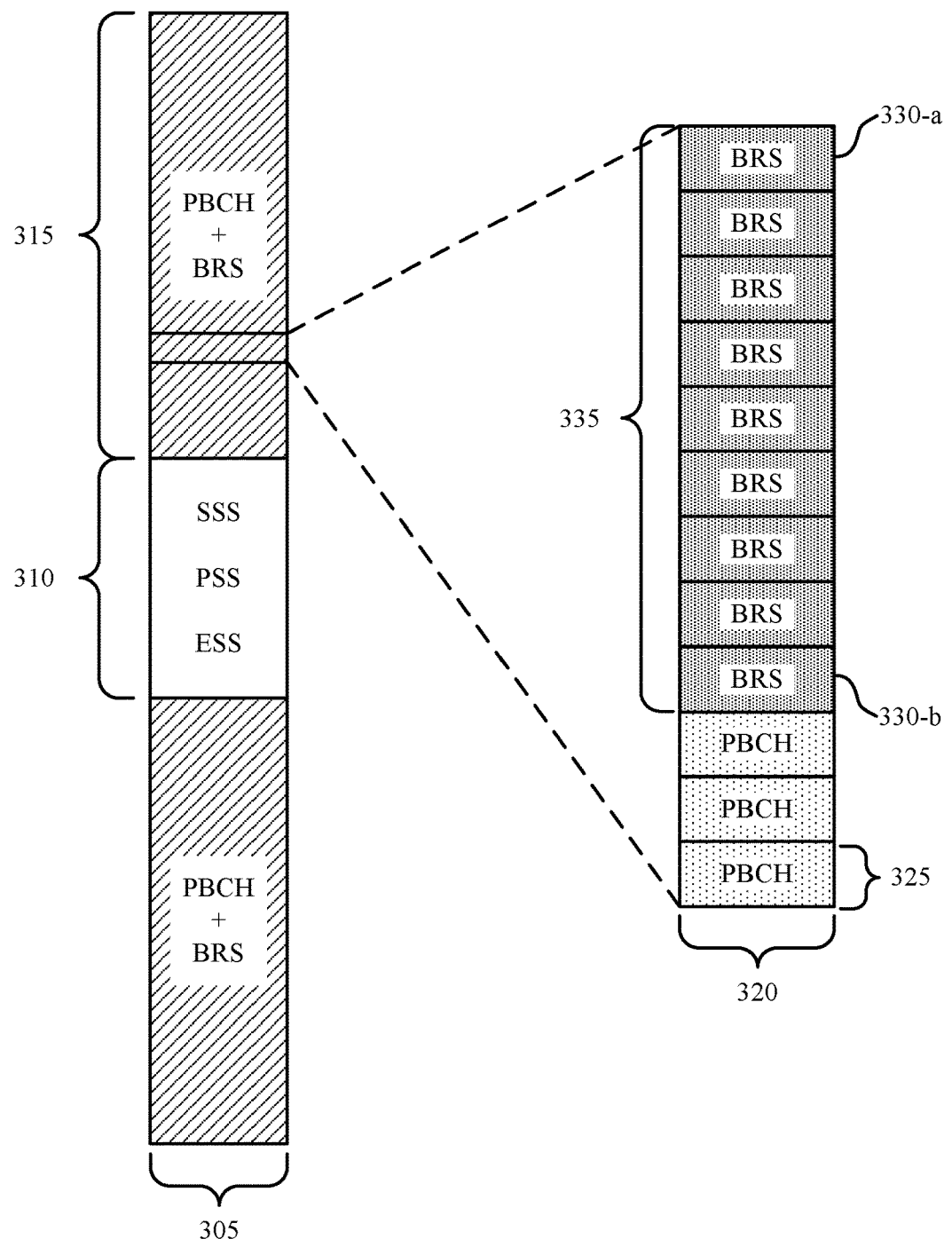
FIG. 3 illustrates an example of a transmission that supports beam reference signals for broadcast decoding in accordance with various aspects of the present disclosure.

FIG. 3 illustrates an example of transmission 300 that supports beam reference signals for broadcast decoding. In some cases, transmission 300 may represent aspects of techniques performed by a UE 115 or base station 105 as described with reference to FIGS. 1 and 2. Transmission 300 may represent an example of using beam reference signal for efficient PBCH signal decoding.

Transmission 300 may include symbol 305, which may be one symbol of one or more subframes (not shown) transmitted from a base station 105 to a UE 115. Symbol 305 may be an example of an orthogonal frequency division multiplexed (OFDM) symbol and may include multiple frequency bands, including synchronization frequency tones 310 and PBCH and beam reference signal frequency tones 315. In some examples, synchronization frequency tones 310 may include a transmission of a SSS, PSS, or ESS, or any combination of these signals.

PBCH and beam reference signal frequency tones 315 may include multiple segments 320, and each segment 320 may include multiple subcarriers 325. In some examples, segment 320 may be the size of a resource block (e.g., segment 320 may include 12 subcarriers 325). Each subcarrier 325 may be used for the transmission of either a beam reference signal or a PBCH. As an example, segment 320 may include nine subcarriers 325 used for a beam reference signal and three subcarriers 325 used for a PBCH. Additionally, eight beam reference signal antenna ports may be code multiplexed (e.g., use orthogonal cover codes) onto the nine subcarriers 325 used for the beam reference signal.

Each beam reference signal may allow for channel estimation for each antenna port throughout a range of frequency tones. That is, a beam reference signal may allow a UE 115 to determine a frequency selectivity of the channels for all antenna ports. In some cases, for each subcarrier allocated for a beam reference signal, each antenna port may transmit using CDM. For example, orthogonal cover code 335 over a set of frequency tones may be applied to multiple subcarriers 325 used for beam reference signals (e.g., nine subcarriers 325). Additionally or alternatively, different subcarriers 325 may be given different weighting. As an example, specific subcarriers may be given a weighting of one, while the remaining subcarriers may be given a different weighting. That is, subcarriers 325 (e.g., first beam reference signal subcarrier 330-a and second beam reference signal subcarrier 330-b) may correspond to antenna ports weighted by one, and may be used to obtain channel estimates. The channel estimates may then be used to decode one or more PBCH signals (e.g., first beam reference signal subcarrier 330-a and second beam reference signal subcarrier 330-b may serve as a DM-RS for the PBCH). In some examples, sections of subcarriers 325 used for PBCH transmissions may be surrounded by two subcarriers 325 that are used as a DM-RS.

Figure 4:
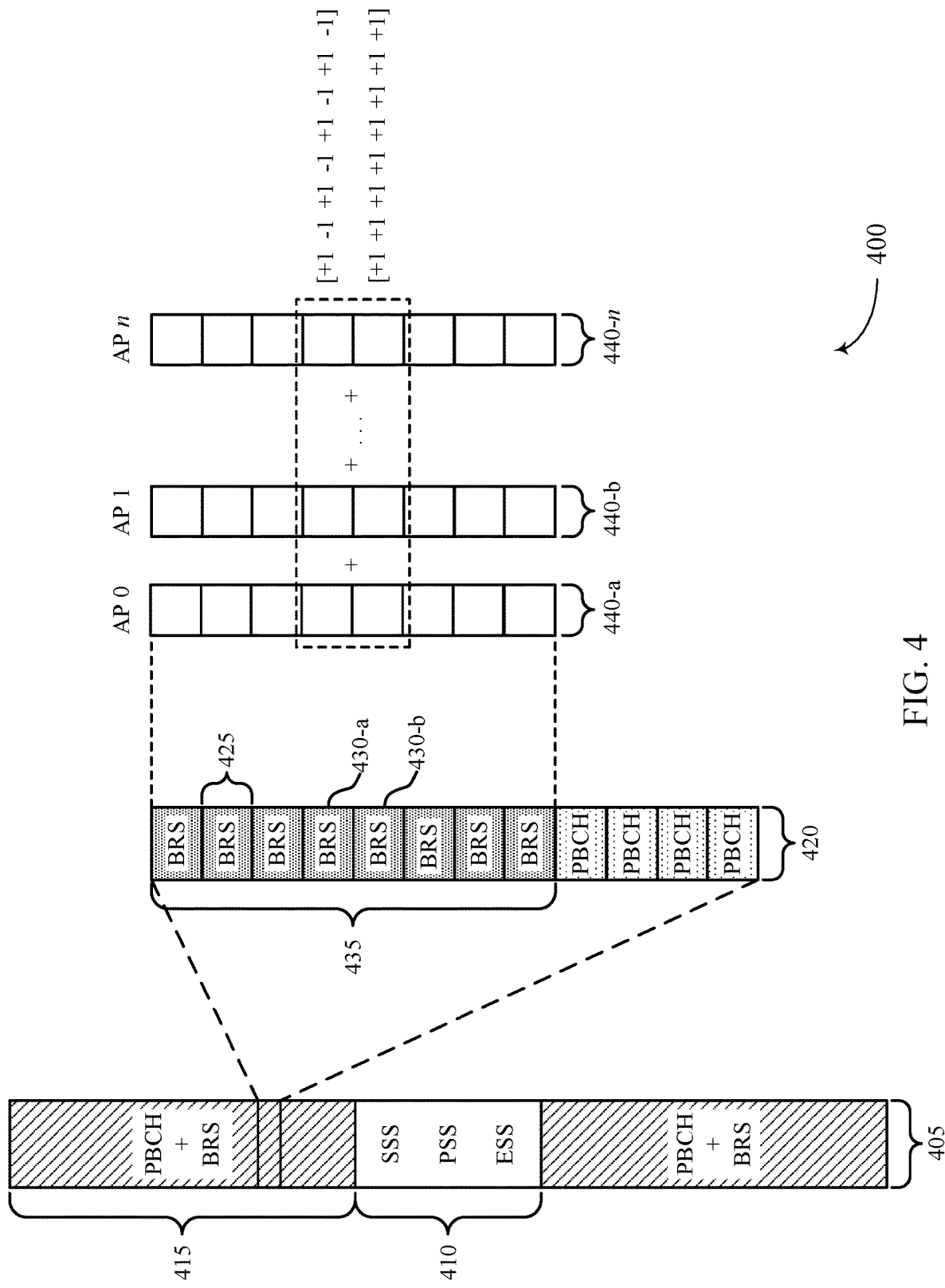
FIG. 4 illustrates an example of another transmission that supports beam reference signals for broadcast decoding in accordance with various aspects of the present disclosure.

FIG. 4 illustrates an example of transmission 400 that supports beam reference signals for broadcast decoding in accordance with various aspects of the present disclosure. In some cases, transmission 400 may represent aspects of techniques performed by a UE 115 or base station 105 as described with reference to FIGS. 1 and 2. Transmission 400 may illustrate an example of using beam reference signals to decode PBCH with paired antenna ports.

Transmission 400 may include symbol 405, which may be one symbol of one or more subframes (e.g., synchronization subframes including one or more synchronization signals) (not shown) transmitted from a base station 105 to a UE 115. Symbol 405 may include multiple frequency bands, including synchronization frequency tones 410 and PBCH and beam reference signal frequency tones 415. In some examples, synchronization frequency tones 410 may include the transmission of a SSS, PSS, or ESS, or any combination of these.

PBCH and beam reference signal frequency tones 415 may include multiple segments 420, and each segment 420 may include multiple subcarriers 425. In some examples, segment 420 may be the size of a resource block (e.g., segment 420 may include 12 subcarriers 425). Each subcarrier 425 may be used for the transmission of either a beam reference signal or a PBCH. As an example, segment 420 may include eight subcarriers 425 used for beam reference signal and four subcarriers 425 used for PBCH. Additionally or alternatively, eight beam reference signal antenna ports may be code division multiplexed onto the eight subcarriers 425 used for beam reference signals. In some cases, a space frequency block code scheme may be used to transmit PBCH signals.

Pairs of antenna ports may be used to transmit in a single direction. For example, eight antenna ports may be used to transmit in four directions. Thus, to decode each PBCH signal, the antenna ports associated with different beam reference signal subframes may use different weights. For example, first beam reference signal subcarrier 430-$a$ (e.g., a reference frequency tone) may have a first set of weights and second beam reference signal subcarrier 430-$b$ (e.g., an additional reference frequency tone) may have a second set of weights according to orthogonal cover code 435.

As an example, orthogonal cover code 435 may include a weight value of one for each of a set of antenna ports. Additionally or alternatively, cover code 435 may include a value of one for a first half of the set of antenna ports and a weight value of negative one for a second half of the set of antenna ports. As a result, reference signals 440-$a$ through 440-$n$ corresponding to different antenna ports (e.g., corresponding to a first antenna port (AP 0) through an nth antenna port (AP n)) may be weighted according to cover code 435. For example, the first beam reference signal subcarrier 430-$a$ may include reference signals 440 that have a first set of weights with values of one and negative one across the set of antenna ports (e.g., [+1−1+1−1+1−1+1], corresponding to 8 antenna ports) where the second beam reference signal subcarrier 430-$b$ may have a second set of weights with a value of one across the set of antenna ports (e.g., [+1+1+1+1+1+1+1], corresponding to 8 antenna ports).

UE 115 may determine two types of channel estimates from beam reference signals associated with the pairs of antenna ports. As an example, first beam reference signal subcarrier 430-$a$ and second beam reference signal subcarrier 430-$b$ may serve as a DM-RS for PBCH signals, and may be located in the middle of a set of beam reference signal subcarriers (e.g., first beam reference signal subcarrier 430-$a$ and second beam reference signal subcarrier 430-$b$ may be adjacent subcarriers, and may be the two middle subcarriers 425 of eight subcarriers 425 used for beam reference signal transmissions). For each subcarrier with a PBCH signal, the antenna ports may use the same weights as in first beam reference signal subcarriers 430-$a$ and second beam reference signal subcarriers 430-$b$. In some examples, each pair of orthogonal cover codes 435 may correspond to a pair of antenna ports transmitting in the same direction.

Figure 5:
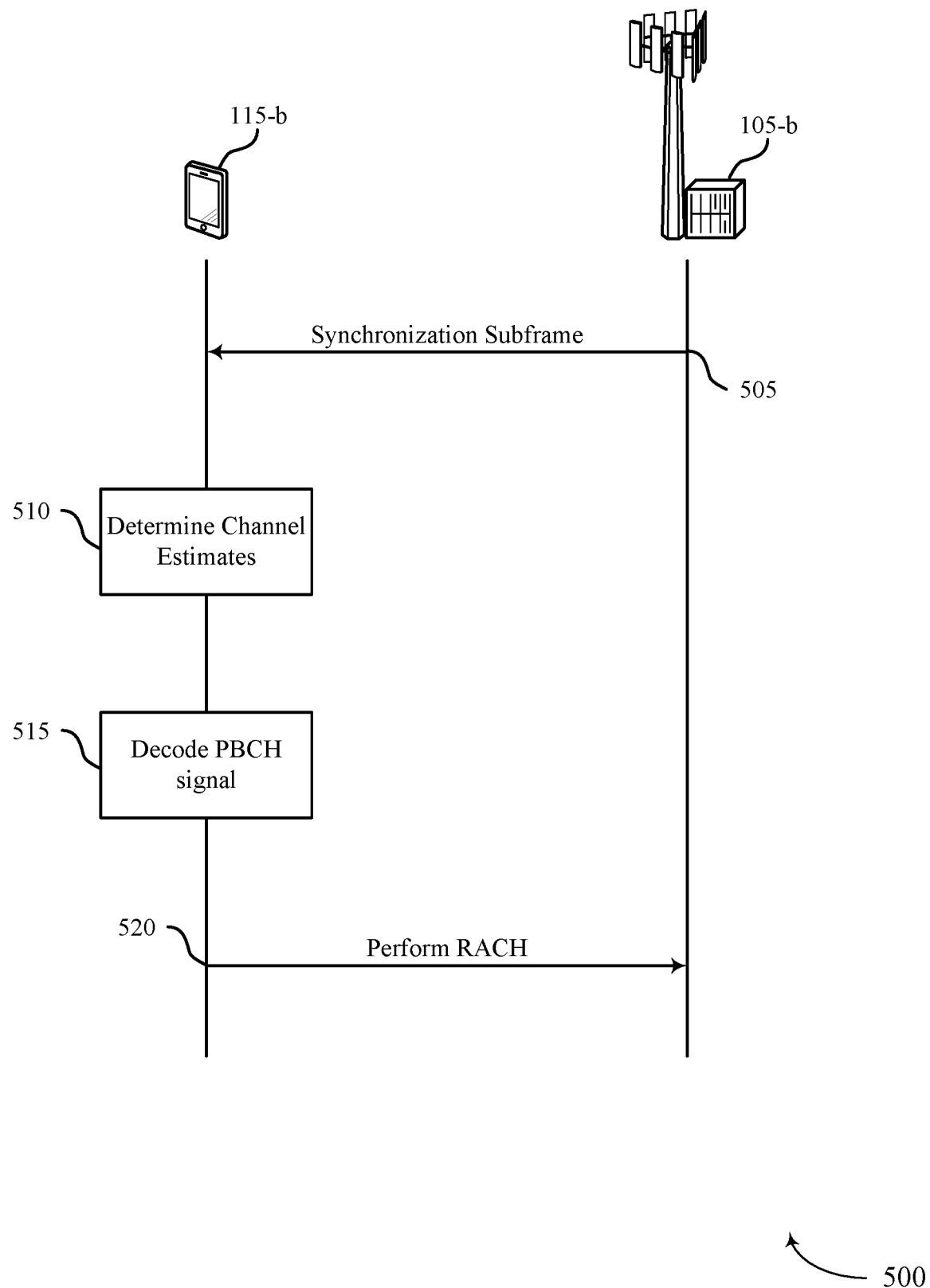
FIG. 5 illustrates an example of a process flow in a system that supports beam reference signals for broadcast decoding in accordance with various aspects of the present disclosure.

FIG. 5 illustrates an example of a process flow 500 that supports beam reference signals for broadcast decoding in accordance with various aspects of the present disclosure. Process flow 500 may include base station 105-$a$ and UE 115-$a$, which may be examples of the corresponding devices described with reference to FIGS. 1 and 2.

At step 505, UE 115-$b$ may receive a subframe including one or more beam reference signals and one or more PBCH signals. The subframe may be a synchronization subframe that includes one or more synchronization signals. In some cases, each of the one or more beam reference signals comprise a set of signals corresponding to a set of antenna ports. In some cases, the one or more PBCH signals include a plurality of PBCH signals that are spatially multiplexed from each antenna port across a same set of resource elements. In some examples, the one or more beam reference signals are code division multiplexed using a set of orthogonal cover codes over a set of frequency tones, wherein each of the set of orthogonal cover codes is associated with an antenna port of the set of antenna ports. In some cases, the set of orthogonal cover codes may be based on a Hadamard matrix or a DFT matrix.

In some cases, UE 115-$a$ may identify a reference frequency tone of a set of frequency tones, wherein the set of orthogonal cover codes comprises a weight value of one for each of the set of antenna ports over the reference frequency tone, where one or more channel estimates are based on identifying the reference frequency tone. A horizontal polarization, a vertical polarization, or both for each of the set of antenna ports may be associated with a transmission direction. Additionally or alternatively, UE 115-$a$ may identify an additional reference frequency tone of the set of frequency tones, wherein the set of orthogonal cover codes comprises a weight value of one for a first half of the set of antenna ports and a weight value of negative one for a second half of the set of antenna ports over the reference frequency tone, and the one or more channel estimates are based at least in part on identifying the additional reference frequency tone.

At step 510, UE 115-$b$ may determine one or more channel estimates based at least in part on the one or more beam reference signals. In some cases, the one or more channel estimates includes a plurality of frequency specific channel estimates. At step 515, UE 115-$b$ may decode one or more PBCH signals based at least in part on the one or more channel estimates. At step 520, UE 115-$b$ may perform an access procedure (e.g., a random access channel (RACH) procedure) with base station 105-$b$ based on the decoding of the one or more PBCH signals.

Figure 6:
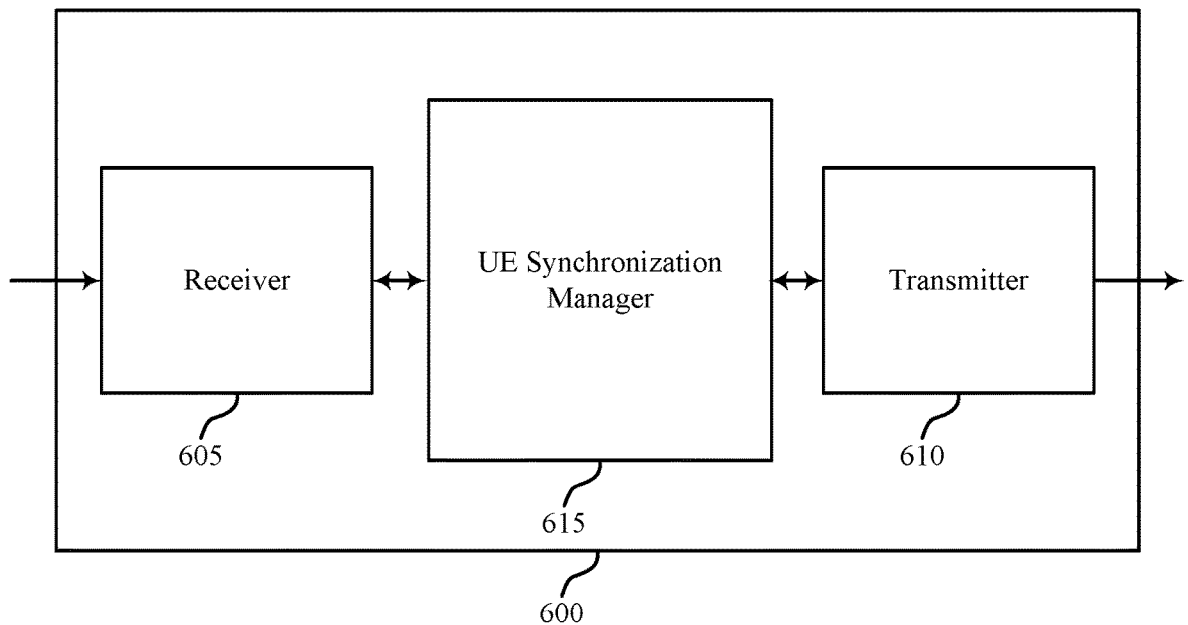
FIGS. 6 through 8 show block diagrams of a wireless device that supports beam reference signals for broadcast decoding in accordance with various aspects of the present disclosure.

FIG. 6 shows a block diagram of a wireless device 600 that supports beam reference signals for broadcast decoding in accordance with various aspects of the present disclosure. Wireless device 600 may be an example of aspects of a UE 115 described with reference to FIGS. 1 and 2. Wireless device 600 may include receiver 605, transmitter 610 and UE synchronization manager 615. Wireless device 600 may also include a processor. Each of these components may be in communication with each other.

The receiver 605 may receive information such as packets, user data, or control information associated with various information channels (e.g., control channels, data channels, and information related to beam reference signal for broadcast decoding, etc.). Information may be passed on to other components of the device. The receiver 605 may be an example of aspects of the transceiver 925 described with reference to FIG. 9.

The transmitter 610 may transmit signals received from other components of wireless device 600. In some examples, the transmitter 610 may be collocated with a receiver in a transceiver module. For example, the transmitter 610 may be an example of aspects of the transceiver 925 described with reference to FIG. 9. The transmitter 610 may include a single antenna, or it may include a plurality of antennas.

The UE synchronization manager 615 may receive a subframe including one or more synchronization signals, one or more beam reference signals, and one or more PBCH signals, determine one or more channel estimates based on the one or more beam reference signals, and decode one or more PBCH signals based on the one or more channel estimates. The UE synchronization manager 615 may also be an example of aspects of the UE synchronization manager 905 described with reference to FIG. 9.

Figure 7:
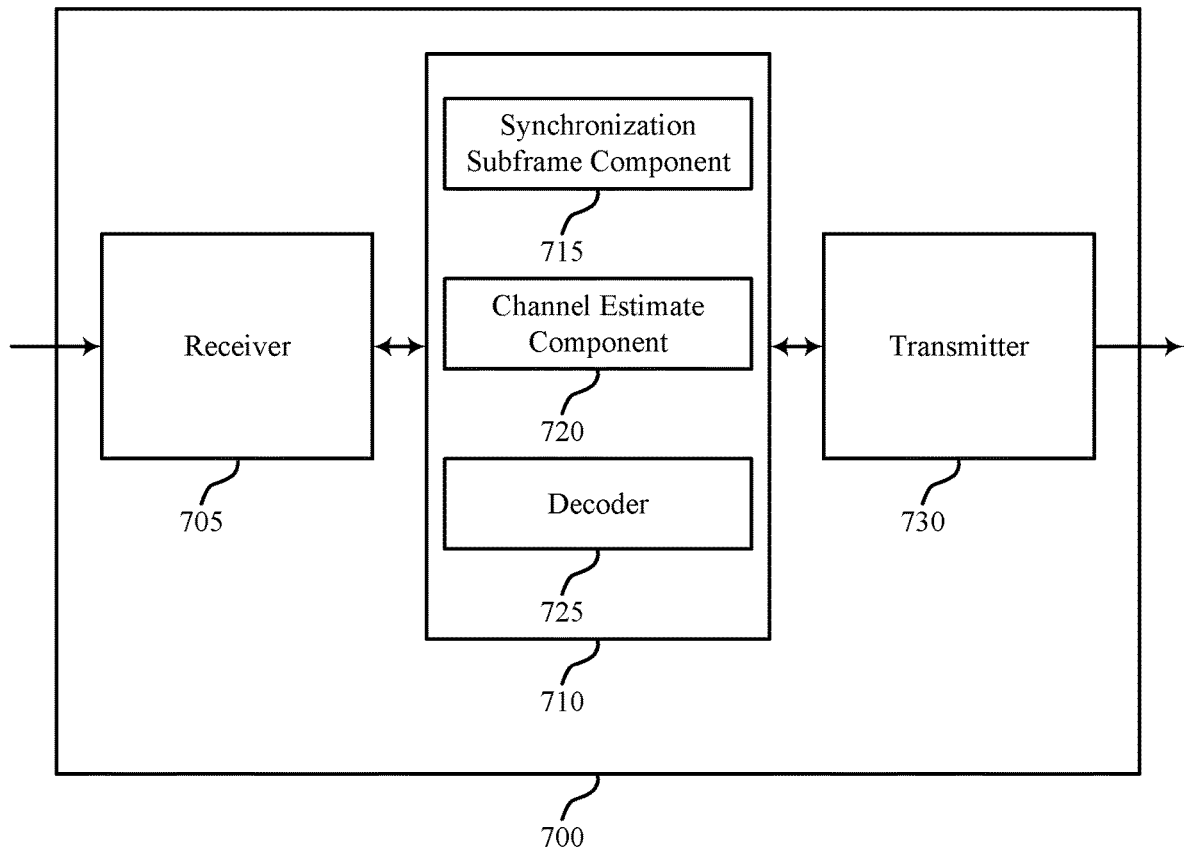

FIG. 7 shows a block diagram of a wireless device 700 that supports beam reference signals for broadcast decoding in accordance with various aspects of the present disclosure. Wireless device 700 may be an example of aspects of a wireless device 600 or a UE 115 described with reference to FIGS. 1, 2 and 6. Wireless device 700 may include receiver 705, UE synchronization manager 710, and transmitter 730. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The UE synchronization manager 710 may be an example of aspects of UE synchronization manager 615 described with reference to FIG. 6. The UE synchronization manager 710 may include synchronization subframe component 715, channel estimate component 720, and decoder 725. The UE synchronization manager 710 may be an example of aspects of the UE synchronization manager 905 described with reference to FIG. 9.

The synchronization subframe component 715 may receive a subframe (e.g., a synchronization subframe) including one or more synchronization signals, one or more beam reference signals, and one or more PBCH signals. In some cases, the one or more PBCH signals include a set of PBCH signals that are spatially multiplexed from each antenna port across a same set of resource elements.

In some cases, the one or more beam reference signals are code division multiplexed using a set of orthogonal cover codes over a set of frequency tones, where each of the set of orthogonal cover codes is associated with an antenna port of the set of antenna ports. In some cases, the set of orthogonal cover codes is based on a Hadamard matrix or a DFT matrix. In some cases, the set of antenna ports includes a set of antenna port pairs, where each antenna port pair of the set of antenna port pairs is associated with a transmission direction. In some cases, the one or more beam reference signals are frequency division multiplexed over a set of frequency tones.

In some cases, the synchronization subframe is received using a mmW radio frequency spectrum band. In some cases, the one or more synchronization signals may include a PSS, SSS, an ESS, or any combination thereof. In some cases, each of the one or more beam reference signals include a set of signals corresponding to a set of antenna ports.

The channel estimate component 720 may determine one or more channel estimates based on the one or more beam reference signals. In some cases, the one or more channel estimates includes a set of frequency specific channel estimates. The decoder 725 may decode one or more PBCH signals based on the one or more channel estimates.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8:
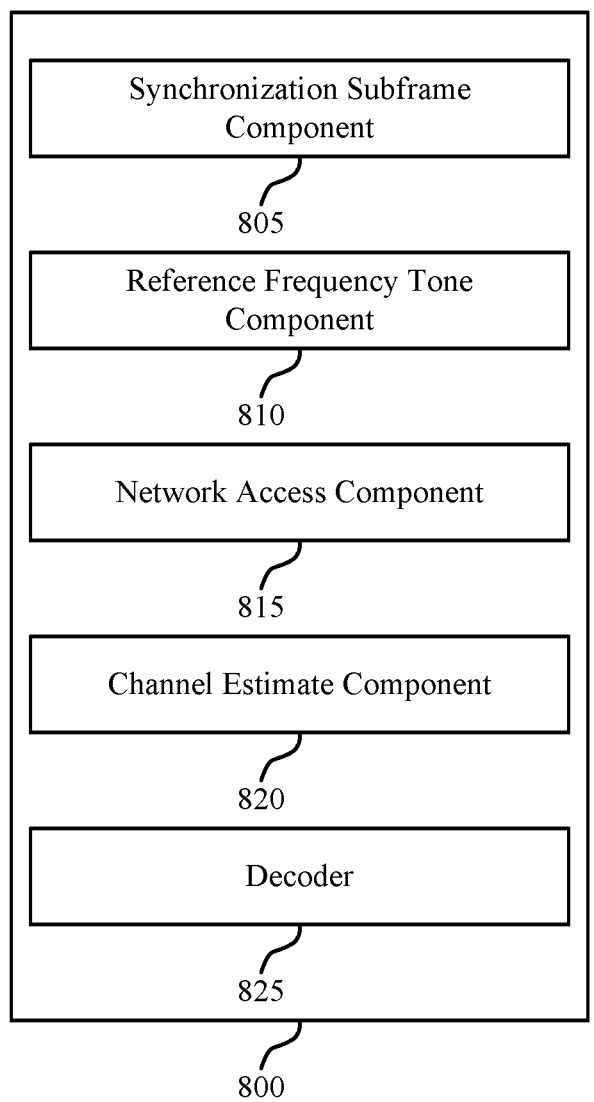

FIG. 8 shows a block diagram of a UE synchronization manager 800 which may be an example of the corresponding component of wireless device 600 or wireless device 700. That is, UE synchronization manager 800 may be an example of aspects of UE synchronization manager 615 or UE synchronization manager 710 described with reference to FIGS. 6 and 7. The UE synchronization manager 800 may also be an example of aspects of the UE synchronization manager 905 described with reference to FIG. 9.

The UE synchronization manager 800 may include synchronization subframe component 805, reference frequency tone component 810, network access component 815, channel estimate component 820, and decoder 825. Each of these modules may communicate, directly or indirectly, with one another (e.g., via one or more buses).

The synchronization subframe component 805 may receive a subframe (e.g., a synchronization subframe) including one or more synchronization signals, one or more beam reference signals, and one or more PBCH signals.

The reference frequency tone component 810 may identify a reference frequency tone of a set of frequency tones, where the set of orthogonal cover codes includes a weight value of one for each of the set of antenna ports over the reference frequency tone, and where the one or more channel estimates may be based on identifying the reference frequency tone. In some examples, the reference frequency tone component 810 may identify an additional reference frequency tone of the set of frequency tones, where the set of orthogonal cover codes includes a weight value of one for a first half of the set of antenna ports and a weight value of negative one for a second half of the set of antenna ports over the reference frequency tone, and the one or more channel estimates are based on identifying the additional reference frequency tone. In some cases, a horizontal polarization, a vertical polarization, or both for each of the set of antenna ports is associated with a transmission direction.

The network access component 815 may perform an access procedure for a wireless network based on decoding the one or more PBCH signals. The channel estimate component 820 may determine one or more channel estimates based on the one or more beam reference signals. In some cases, the one or more channel estimates includes a set of frequency specific channel estimates. The decoder 825 may decode one or more PBCH signals based on the one or more channel estimates.

Figure 9:
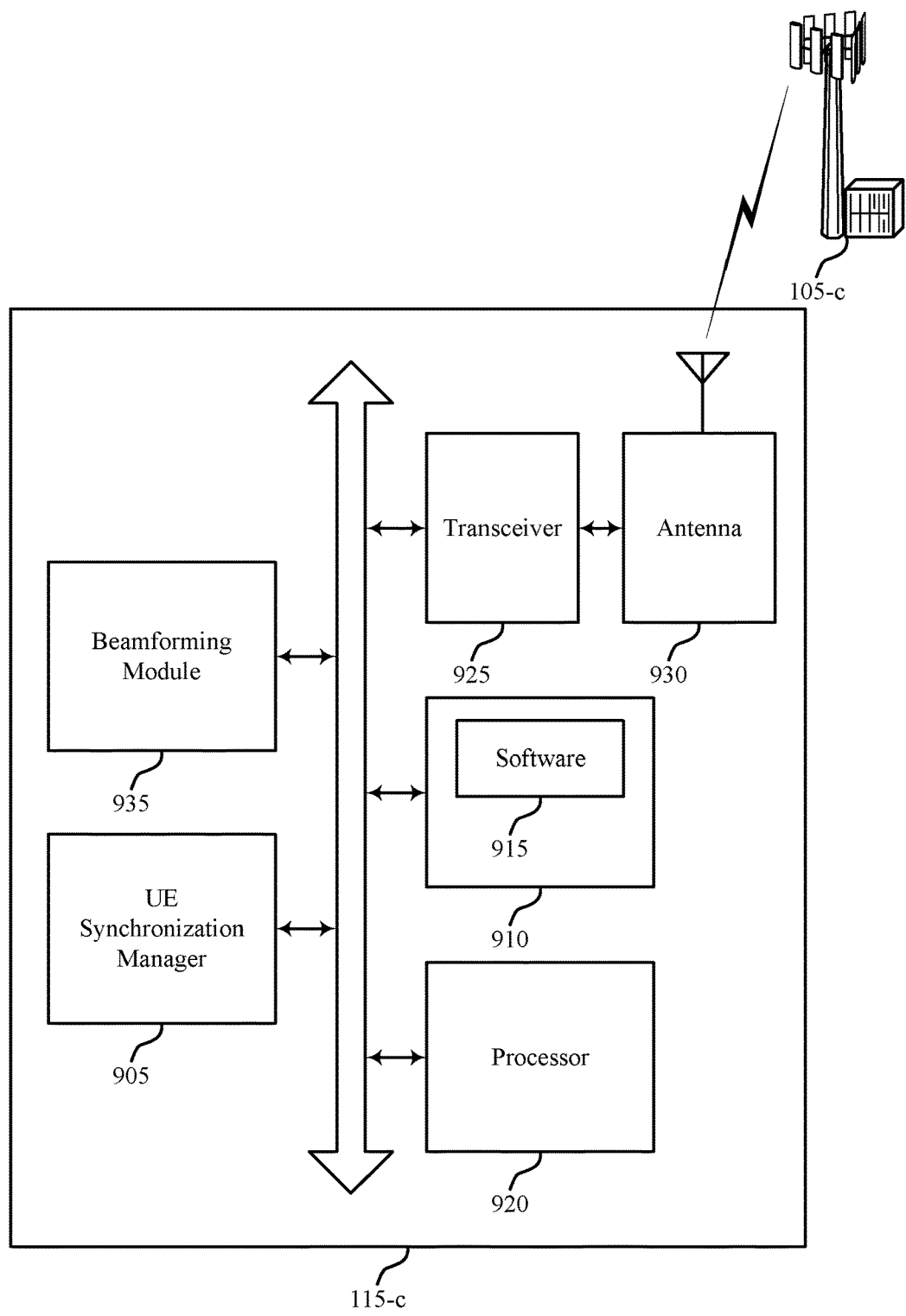
FIG. 9 illustrates a block diagram of a system including a device that supports beam reference signals for broadcast decoding in accordance with various aspects of the present disclosure.

FIG. 9 shows a diagram of a system 900 including a device that supports beam reference signals for broadcast decoding in accordance with various aspects of the present disclosure. For example, system 900 may include UE 115-*c*, which may be an example of a wireless device 600, a wireless device 700, or a UE 115 as described with reference to FIGS. 1, 2 and 6 through 8.

UE 115-*c* may also include UE synchronization manager 905, memory 910, processor 920, transceiver 925, antenna 930 and beamforming module 935. Each of these modules may communicate, directly or indirectly, with one another (e.g., via one or more buses). The UE synchronization manager 905 may be an example of a UE synchronization manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., beam reference signal for broadcast decoding, etc.). In some cases, the software 915 may not be directly executable by the processor but may cause a computer (e.g., when compiled and executed) to perform functions described herein.

The processor 920 may include an intelligent hardware device, (e.g., a central processing unit (CPU), a microcontroller, an application specific integrated circuit (ASIC), etc.). The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, the device may have more than one antenna 930, which may be capable of concurrently transmitting or receiving multiple wireless transmissions.

Figure 10:
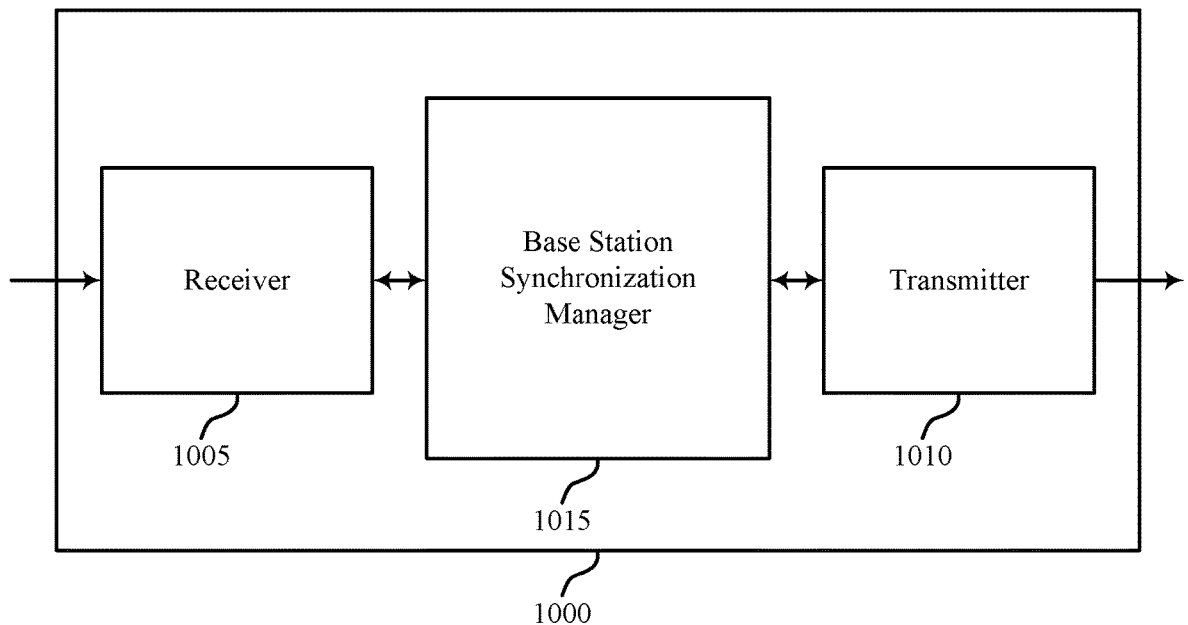
FIGS. 10 through 12 show block diagrams of a wireless device that supports beam reference signals for broadcast decoding in accordance with various aspects of the present disclosure.

FIG. 10 shows a block diagram of a wireless device 1000 that supports beam reference signals for broadcast decoding in accordance with various aspects of the present disclosure. Wireless device 1000 may be an example of aspects of a base station 105 described with reference to FIGS. 1 and 2. Wireless device 1000 may include receiver 1005, transmitter 1010, and base station synchronization manager 1015. Wireless device 1000 may also include a processor. Each of these components may be in communication with each other.

The receiver 1005 may receive information such as packets, user data, or control information associated with various information channels (e.g., control channels, data channels, and information related to beam reference signal for broadcast decoding, etc.). Information may be passed on to other components of the device. The receiver 1005 may be an example of aspects of the transceiver 1325 described with reference to FIG. 13.

The transmitter 1010 may transmit signals received from other components of wireless device 1000. In some examples, the transmitter 1010 may be collocated with a receiver in a transceiver module. For example, the transmitter 1010 may be an example of aspects of the transceiver 1325 described with reference to FIG. 13. The transmitter 1010 may include a single antenna, or it may include a plurality of antennas.

The base station synchronization manager 1015 may transmit a subframe (e.g., a synchronization subframe) including one or more synchronization signals, one or more beam reference signals, and one or more PBCH signals, where the one or more beam reference signals are configured to be used as a basis for one or more channels for decoding one or more PBCH signals. The base station synchronization manager 1015 may also be an example of aspects of the base station synchronization manager 1305 described with reference to FIG. 13.

Figure 11:
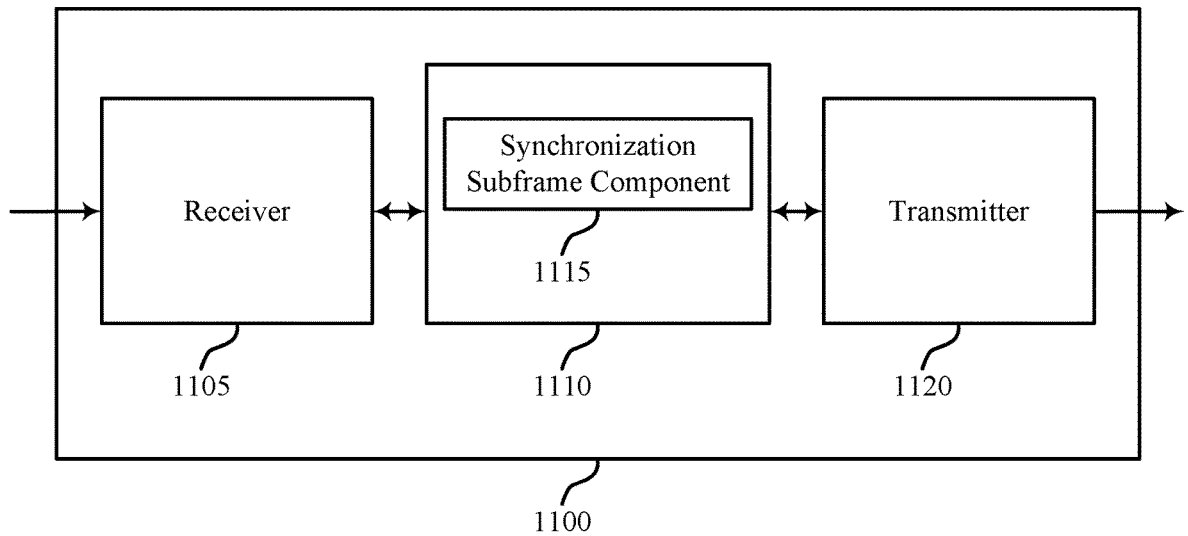

FIG. 11 shows a block diagram of a wireless device 1100 that supports beam reference signals for broadcast decoding in accordance with various aspects of the present disclosure. Wireless device 1100 may be an example of aspects of a wireless device 1000 or a base station 105 described with reference to FIGS. 1, 2 and 10. Wireless device 1100 may include receiver 1105, base station synchronization manager 1110, and transmitter 1120. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station synchronization manager 1110 may be an example of aspects of base station synchronization manager 1015 described with reference to FIG. 10. The base station synchronization manager 1110 may include synchronization subframe component 1115. The base station synchronization manager 1110 may be an example of aspects of the base station synchronization manager 1305 described with reference to FIG. 13.

The synchronization subframe component 1115 may transmit a subframe including one or more synchronization signals, one or more beam reference signals, and one or more PBCH signals, where the one or more beam reference signals are configured to be used as a basis for one or more channels for decoding one or more PBCH signals. In some cases, each of the one or more beam reference signals include a set of signals corresponding to a set of antenna ports. In some cases, the set of antenna ports includes a set of antenna port pairs, and each of the set of antenna port pairs may be associated with a transmission direction.

The transmitter 1120 may transmit signals received from other components of wireless device 1100. In some examples, the transmitter 1120 may be collocated with a receiver in a transceiver module. For example, the transmitter 1120 may be an example of aspects of the transceiver 1325 described with reference to FIG. 13. The transmitter 1120 may utilize a single antenna, or it may utilize a plurality of antennas.

Figure 12:
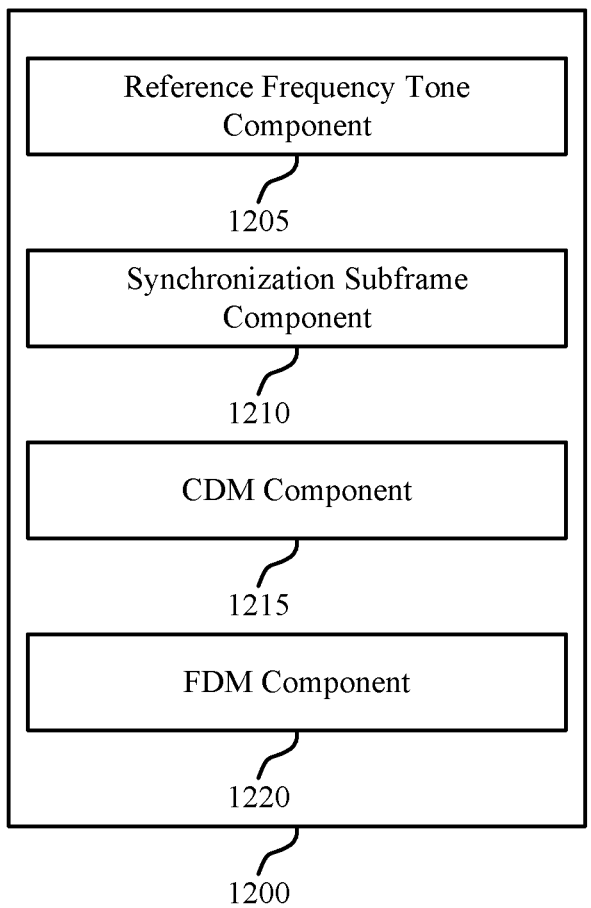

FIG. 12 shows a block diagram of a base station synchronization manager 1200 which may be an example of the corresponding component of wireless device 1000 or wireless device 1100. That is, base station synchronization manager 1200 may be an example of aspects of base station synchronization manager 1015 or base station synchronization manager 1110 described with reference to FIGS. 10 and 11. The base station synchronization manager 1200 may also be an example of aspects of the base station synchronization manager 1305 described with reference to FIG. 13.

The base station synchronization manager 1200 may include reference frequency tone component 1205, synchronization subframe component 1210, CDM component 1215, and FDM component 1220. Each of these modules may communicate, directly or indirectly, with one another (e.g., via one or more buses).

The reference frequency tone component 1205 may identify a reference frequency tone of a set of frequency tones, where the orthogonal cover code includes a weight value of one for each of the set of antenna ports over the reference frequency tone, where the one or more channel estimates may be based on the reference frequency tone. In some examples, reference frequency tone component 1205 may identify an additional reference frequency tone of the set of frequency tones, where the orthogonal cover code includes a weight value of one for a first half of the set of antenna ports and a weight value of negative one for a second half of the set of antenna ports over the reference frequency tone, and the one or more channel estimates may be based on the additional reference frequency tone.

The synchronization subframe component 1210 may transmit a subframe (e.g., a synchronization subframe) including one or more synchronization signals, one or more beam reference signals, and one or more PBCH signals, where the one or more beam reference signals are configured to be used as a basis for one or more channels for decoding one or more PBCH signals. In some cases, each of the one or more beam reference signals include a set of signals corresponding to a set of antenna ports. In some cases, the set of antenna ports includes a set of antenna port pairs, each of the set of antenna port pairs may be associated with a transmission direction. The CDM component 1215 may generate beam reference signals that are code division multiplexed over a set of frequency tones. The FDM component 1220 may generate beam reference signals that are frequency division multiplexed over a set of frequency tones.

Figure 13:
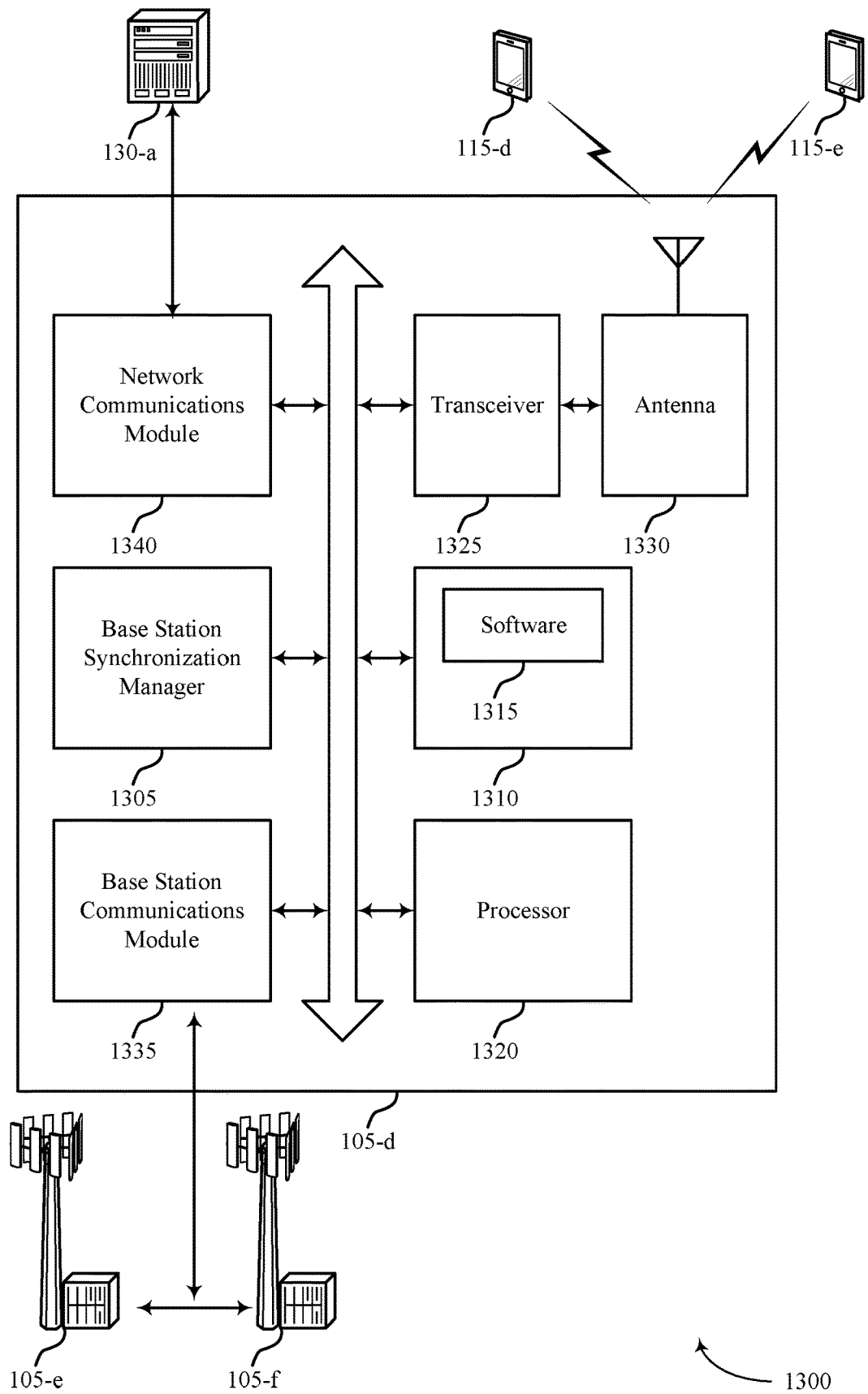
FIG. 13 illustrates a diagram of a wireless communications system including a device that supports beam reference signals for broadcast decoding in accordance with various aspects of the present disclosure.

FIG. 13 shows a diagram of a wireless communications system 1300 including a device configured that supports beam reference signals for broadcast decoding in accordance with various aspects of the present disclosure. For example, wireless communications system 1300 may include base station 105-*d*, which may be an example of a wireless device 1000, a wireless device 1100, or a base station 105 as described with reference to FIGS. 1, 2 and 10 through 12. Base station 105-*d* may also include components for bi-directional voice and data communications including components for transmitting communications and components for receiving communications. For example, base station 105-*d* may communicate bi-directionally with one or more UEs 115.

Base station 105-*d* may also include base station synchronization manager 1305, memory 1310, processor 1320, transceiver 1325, antenna 1330, base station communications module 1335, and network communications module 1340. Each of these modules may communicate, directly or indirectly, with one another (e.g., via one or more buses). The base station synchronization manager 1305 may be an example of a base station synchronization manager as described with reference to FIGS. 10 through 12.

The memory 1310 may include RAM and ROM. The memory 1310 may store computer-readable, computer-executable software including instructions that, when executed, cause the processor to perform various functions described herein (e.g., beam reference signal for broadcast decoding, etc.). In some cases, the software 1315 may not be directly executable by the processor but may cause a computer (e.g., when compiled and executed) to perform functions described herein. The processor 1320 may include an intelligent hardware device (e.g., a CPU, a microcontroller, an ASIC, etc.).

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the transceiver 1325 may include a single antenna 1330. However, the transceiver 1325 may have more than one antenna 1330, which may be capable of concurrently transmitting or receiving multiple wireless transmissions.

The base station communications module 1335 may manage communications with other base stations 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
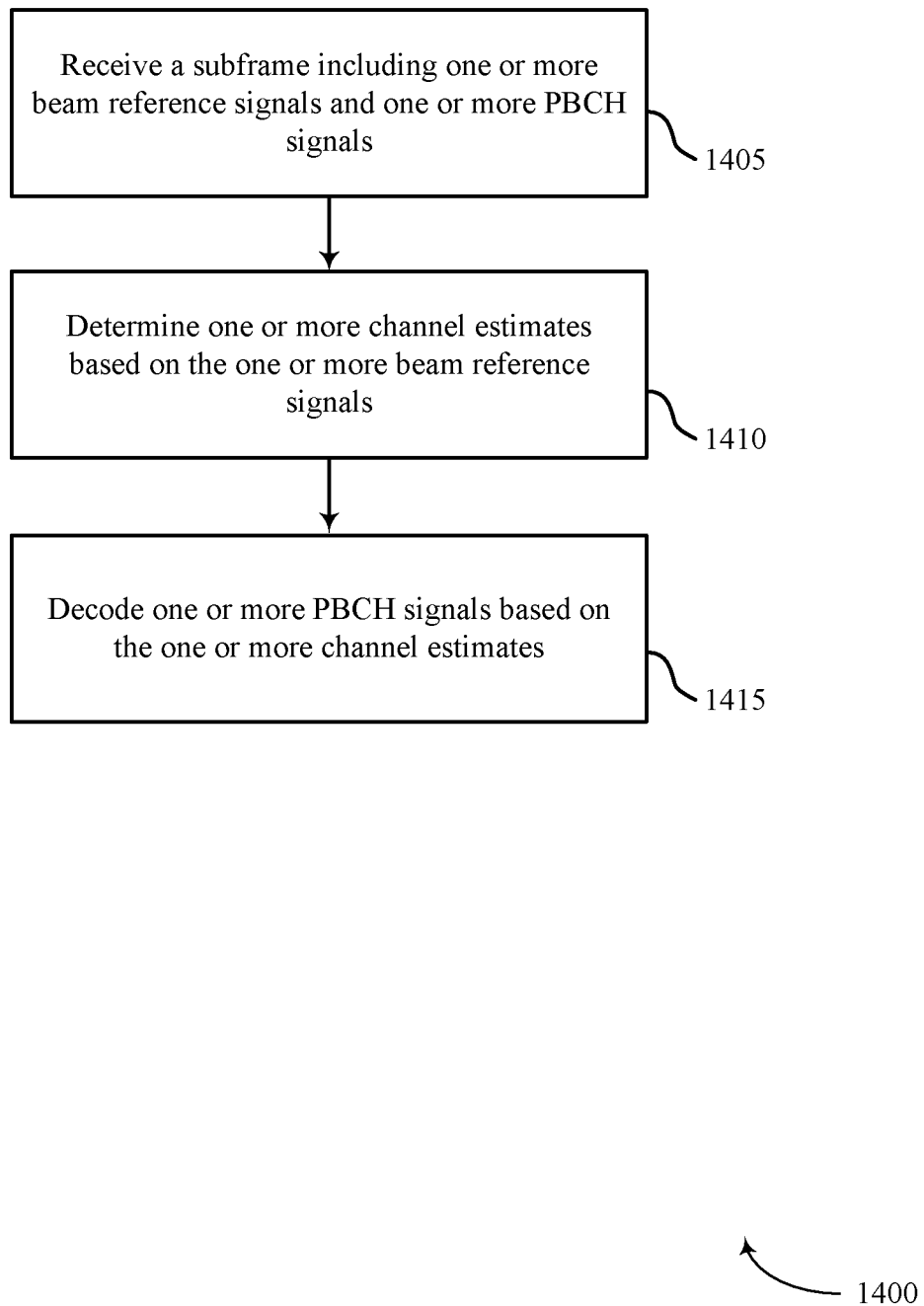
FIGS. 14 through 18 show flowcharts illustrating methods for beam reference signals for broadcast decoding in accordance with various aspects of the present disclosure.

FIG. 14 shows a flowchart illustrating a method 1400 for beam reference signals for broadcast decoding in accordance with various aspects of the present disclosure. The operations of method 1400 may be implemented by a device such as a UE 115 or its components as described with reference to FIGS. 1 and 2. For example, the operations of method 1400 may be performed by the UE synchronization manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a subframe including one or more beam reference signals and one or more PBCH signals as described above with reference to FIGS. 2 through 5. In some examples, the operations of block 1405 may be performed by the synchronization subframe component as described with reference to FIGS. 7 and 8.

At block 1410, the UE 115 may determine one or more channel estimates based on the one or more beam reference signals as described above with reference to FIGS. 2 through 5. In some examples, the operations of block 1410 may be performed by the channel estimate component as described with reference to FIGS. 7 and 8.

At block 1415, the UE 115 may decode one or more PBCH signals based on the one or more channel estimates as described above with reference to FIGS. 2 through 5. In some examples, the operations of block 1415 may be performed by the decoder as described with reference to FIGS. 7 and 8.

Figure 15:
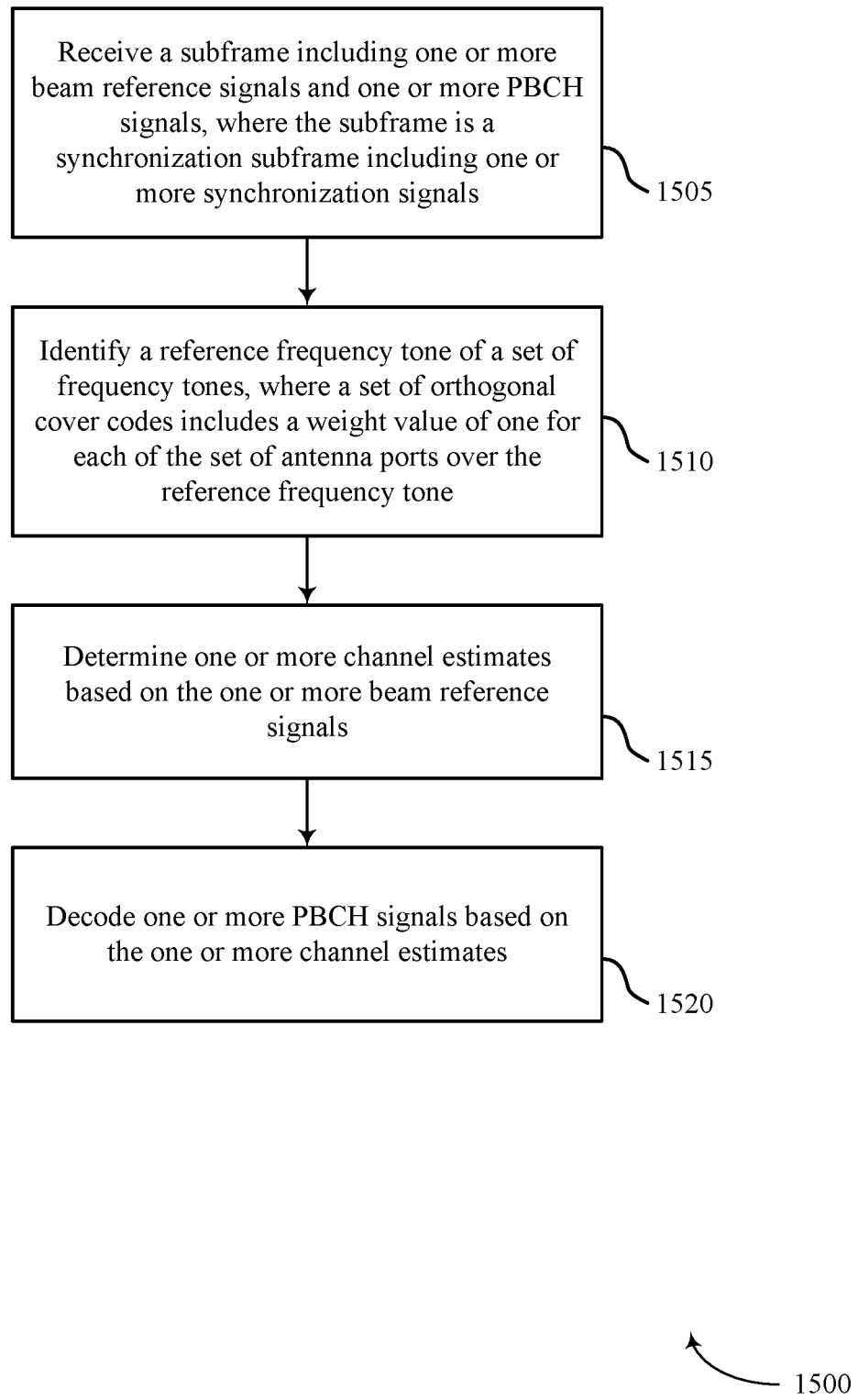

FIG. 15 shows a flowchart illustrating a method 1500 for beam reference signals for broadcast decoding in accordance with various aspects of the present disclosure. The operations of method 1500 may be implemented by a device such as a UE 115 or its components as described with reference to FIGS. 1 and 2. For example, the operations of method 1500 may be performed by the UE synchronization manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a subframe including one or more beam reference signals and one or more PBCH signals as described above with reference to FIGS. 2 through 5. In some cases, the subframe may be a synchronization subframe including one or more synchronization signals. In some examples, the operations of block 1505 may be performed by the synchronization subframe component as described with reference to FIGS. 7 and 8.

At block 1510, the UE 115 may identify a reference frequency tone of a set of frequency tones, where the set of orthogonal cover codes includes a weight value of one for each of the set of antenna ports over the reference frequency tone, where the one or more channel estimates are based on identifying the reference frequency tone as described above with reference to FIGS. 2 through 5. In some cases, each of the one or more beam reference signals include a set of signals corresponding to a set of antenna ports. In some cases, the one or more beam reference signals are code division multiplexed using a set of orthogonal cover codes over a set of frequency tones, where each of the set of orthogonal cover codes is associated with an antenna port of the set of antenna ports. In certain examples, the operations of block 1510 may be performed by the reference frequency tone component as described with reference to FIGS. 7 and 8.

At block 1515, the UE 115 may determine one or more channel estimates based on the one or more beam reference signals as described above with reference to FIGS. 2 through 5. In some examples, the operations of block 1515 may be performed by the channel estimate component as described with reference to FIGS. 7 and 8.

At block 1520, the UE 115 may decode one or more PBCH signals based on the one or more channel estimates as described above with reference to FIGS. 2 through 5. In some examples, the operations of block 1520 may be performed by the decoder as described with reference to FIGS. 7 and 8.

Figure 16:
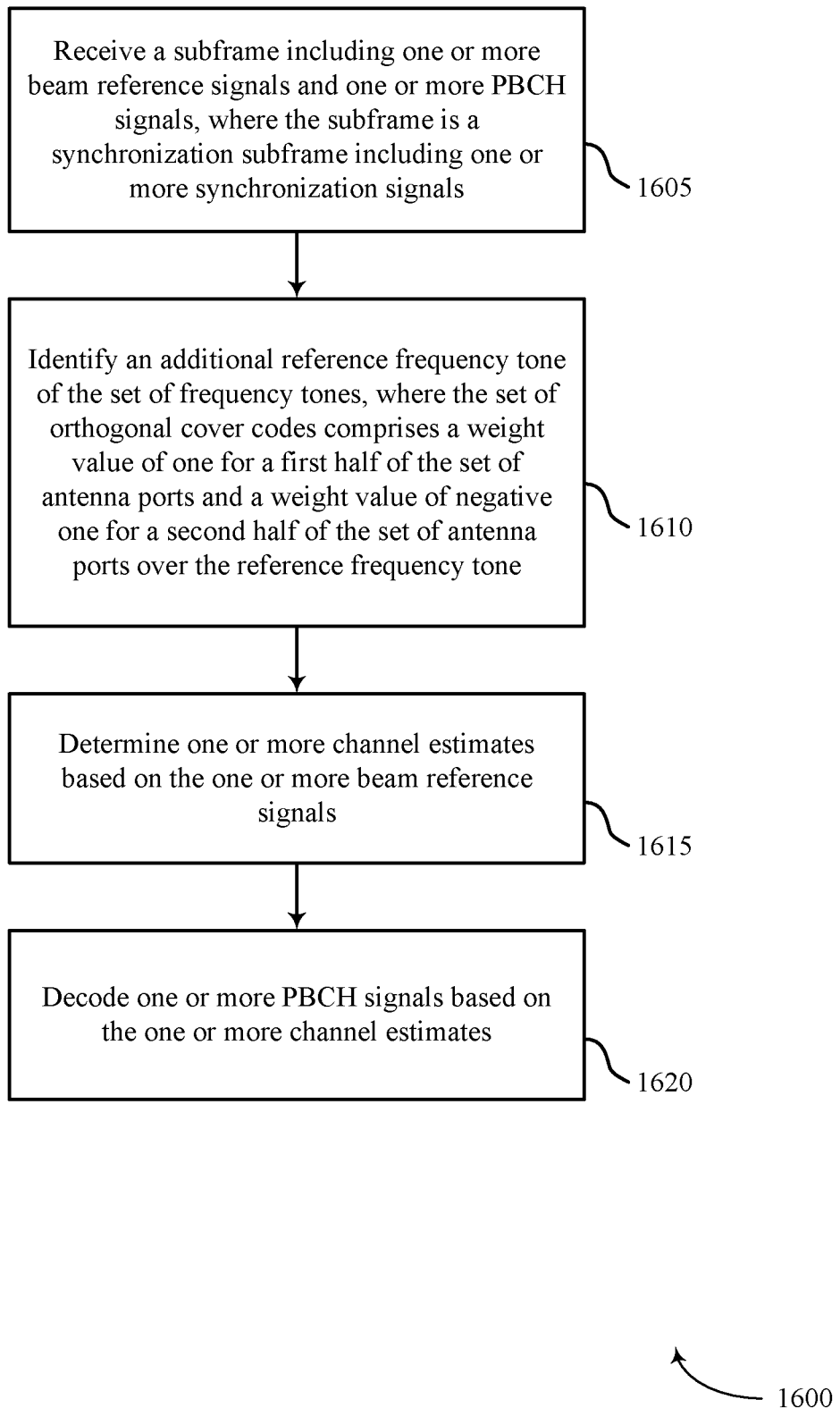

FIG. 16 shows a flowchart illustrating a method 1600 for beam reference signals for broadcast decoding in accordance with various aspects of the present disclosure. The operations of method 1600 may be implemented by a device such as a UE 115 or its components as described with reference to FIGS. 1 and 2. For example, the operations of method 1600 may be performed by the UE synchronization manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive a subframe including one or more beam reference signals and one or more PBCH signals, where the subframe may be a synchronization subframe including one or more synchronization signals, as described above with reference to FIGS. 2 through 5. In some examples, the operations of block 1605 may be performed by the synchronization subframe component as described with reference to FIGS. 7 and 8.

At block 1610, the UE 115 may identify an additional reference frequency tone of the set of frequency tones, where the set of orthogonal cover codes includes a weight value of one for a first half of the set of antenna ports and a weight value of negative one for a second half of the set of antenna ports over the reference frequency tone, and the one or more channel estimates are based on identifying the additional reference frequency tone as described above with reference to FIGS. 2 through 5. In some cases, each of the one or more beam reference signals include a set of signals corresponding to a set of antenna ports. In some cases, the one or more beam reference signals are code division multiplexed using a set of orthogonal cover codes over a set of frequency tones, where each of the set of orthogonal cover codes is associated with an antenna port of the set of antenna ports. In certain examples, the operations of block 1610 may be performed by the reference frequency tone component as described with reference to FIGS. 7 and 8.

At block 1615, the UE 115 may determine one or more channel estimates based on the one or more beam reference signals as described above with reference to FIGS. 2 through 5. In some examples, the operations of block 1615 may be performed by the channel estimate component as described with reference to FIGS. 7 and 8.

At block 1620, the UE 115 may decode one or more PBCH signals based on the one or more channel estimates as described above with reference to FIGS. 2 through 5. In some examples, the operations of block 1620 may be performed by the decoder as described with reference to FIGS. 7 and 8.

Figure 17:
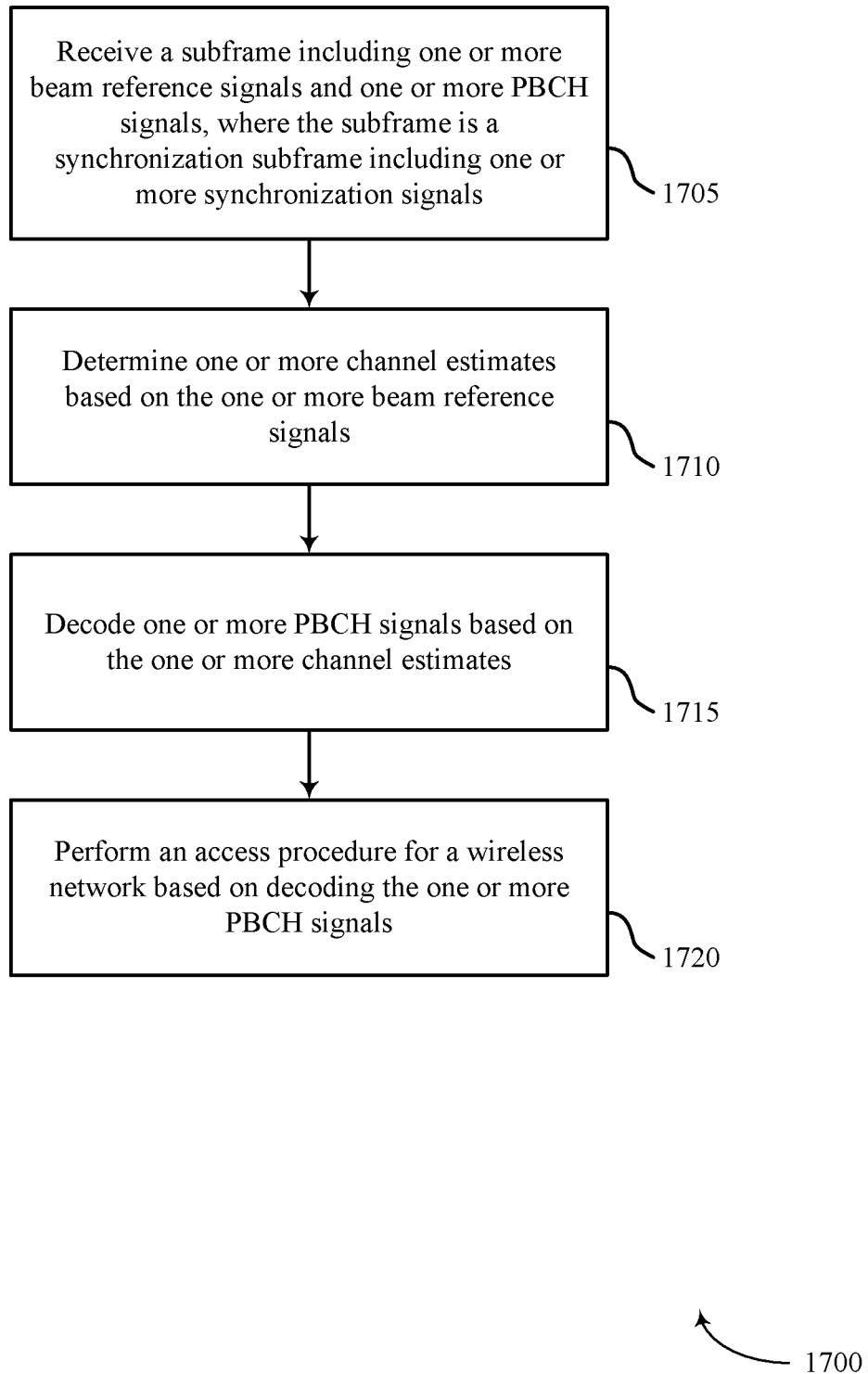

FIG. 17 shows a flowchart illustrating a method 1700 for beam reference signals for broadcast decoding in accordance with various aspects of the present disclosure. The operations of method 1700 may be implemented by a device such as a UE 115 or its components as described with reference to FIGS. 1 and 2. For example, the operations of method 1700 may be performed by the UE synchronization manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive a subframe including one or more beam reference signals and one or more PBCH signals as described above with reference to FIGS. 2 through 5. In some cases, the subframe may be a synchronization subframe including one or more synchronization signals. In some examples, the operations of block 1705 may be performed by the synchronization subframe component as described with reference to FIGS. 7 and 8.

At block 1710, the UE 115 may determine one or more channel estimates based on the one or more beam reference signals as described above with reference to FIGS. 2 through 5. In some examples, the operations of block 1710 may be performed by the channel estimate component as described with reference to FIGS. 7 and 8.

At block 1715, the UE 115 may decode one or more PBCH signals based on the one or more channel estimates as described above with reference to FIGS. 2 through 5. In some examples, the operations of block 1715 may be performed by the decoder as described with reference to FIGS. 7 and 8.

At block 1720, the UE 115 may perform an access procedure for a wireless network based on decoding the one or more PBCH signals as described above with reference to FIGS. 2 through 5. In some examples, the operations of block 1720 may be performed by the network access component as described with reference to FIGS. 7 and 8.

Figure 18:
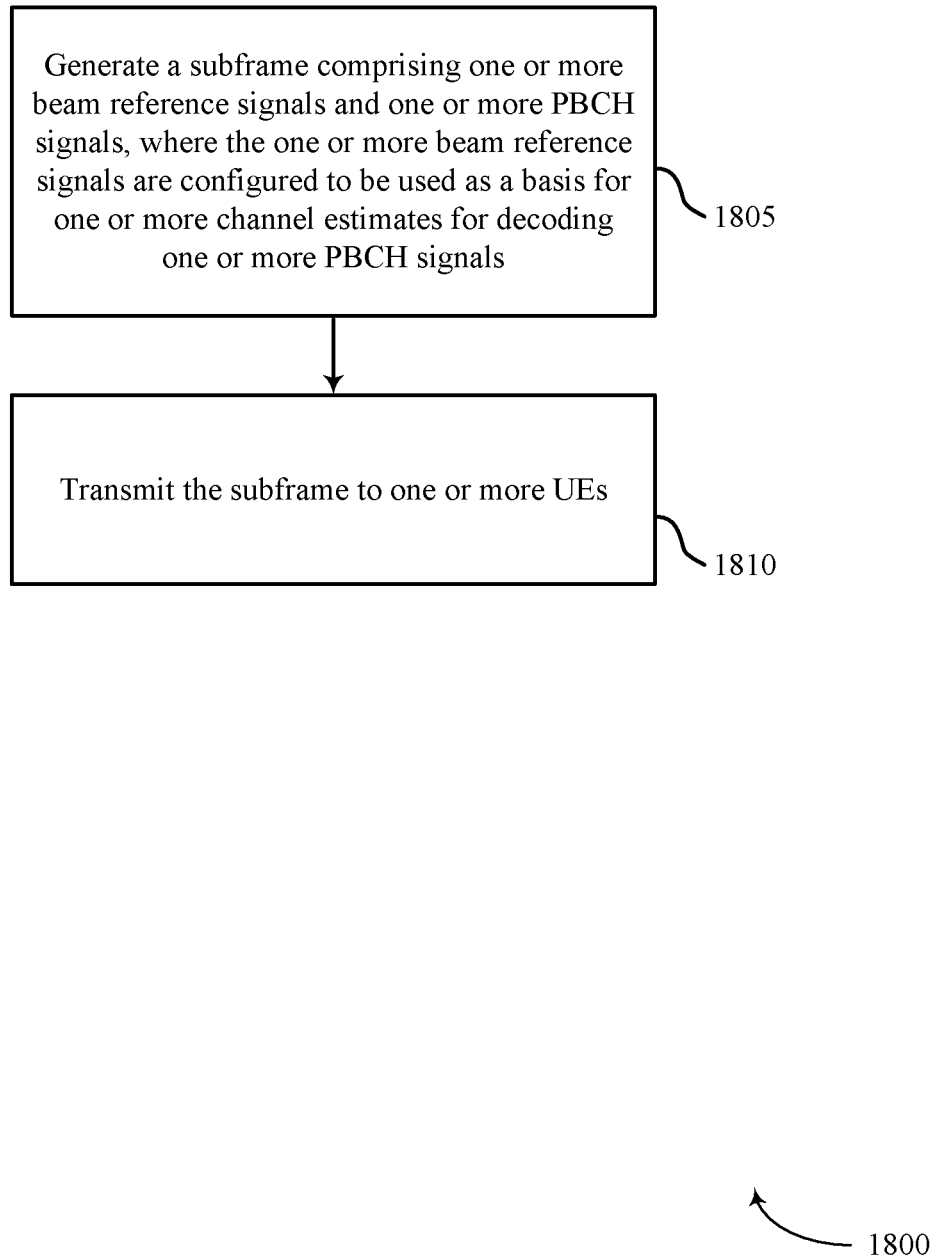

FIG. 18 shows a flowchart illustrating a method 1800 for beam reference signals for broadcast decoding in accordance with various aspects of the present disclosure. The operations of method 1800 may be implemented by a device such as a base station 105 or its components as described with reference to FIGS. 1 and 2. For example, the operations of method 1800 may be performed by the base station synchronization manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may generate a subframe including one or more beam reference signals and one or more PBCH signals, where the one or more beam reference signals are configured to be used as a basis for one or more channels for decoding one or more PBCH signals as described above with reference to FIGS. 2 through 5. In some cases, the subframe may be a synchronization subframe including one or more synchronization signals. In some examples, the operations of block 1805 may be performed by the synchronization subframe component as described with reference to FIGS. 11 and 12. At block 1810, the base station 105 may transmit the subframe to one or more UEs 115 using beamforming techniques.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for beam reference signal for broadcast decoding.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Techniques described herein may be used for various wireless communications systems such as code division multiple access (CDMA), time division multiple access (TDMA), frequency division multiple access (FDMA), orthogonal frequency-division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile communications (GSM). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (UMTS). 3GPP LTE and LTE-advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier, or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for beam reference signal for broadcast decoding. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:
1. A method of wireless communication comprising:
receiving a subframe comprising one or more beam reference signals and one or more physical broadcast channel (PBCH) signals over a set of frequency tones, wherein the subframe comprises information associating each beam reference signal to a respective antenna port of an associated base station;
identifying a reference frequency tone of the set of frequency tones corresponding to the one or more beam reference signals;
determining a plurality of frequency-band specific channel estimates based at least in part on the one or more beam reference signals and the identified reference frequency tone; and decoding one or more PBCH signals based at least in part on the plurality of frequency-band specific channel estimates.

2. The method of claim 1, wherein the subframe is a synchronization subframe comprising one or more synchronization signals.

3. The method of claim 2, wherein the one or more synchronization signals comprise a primary synchronization signal, a secondary synchronization signal, an extended synchronization signal, or any combination thereof.

4. The method of claim 1, wherein each of the one or more beam reference signals comprise a set of signals corresponding to a set of antenna ports.

5. The method of claim 4, wherein the one or more PBCH signals comprise a plurality of PBCH signals that are spatially multiplexed from each antenna port across a same set of resource elements.

6. The method of claim 4, wherein the one or more beam reference signals are code division multiplexed using a set of orthogonal cover codes over the set of frequency tones, wherein each of the set of orthogonal cover codes is associated with an antenna port of the set of antenna ports.

7. The method of claim 6, wherein the set of orthogonal cover codes is based at least in part on a Hadamard matrix or a DFT matrix.

8. The method of claim 6,
wherein the set of orthogonal cover codes comprises a weight value of one for each of the set of antenna ports over the reference frequency tone, and the method further comprising:
identifying an additional reference frequency tone of the set of frequency tones, wherein the set of orthogonal cover codes comprises a weight value of one for a first half of the set of antenna ports and a weight value of negative one for a second half of the set of antenna ports over the additional reference frequency tone, and wherein the plurality of frequency-band specific channel estimates are based at least in part on identifying the additional reference frequency tone.

9. The method of claim 8, wherein the reference frequency tone and the additional reference frequency tone are middle tones of the set of frequency tones.

10. The method of claim 8, wherein a horizontal polarization, a vertical polarization, or both for each of the set of antenna ports is associated with a transmission direction.

11. The method of claim 4, wherein the set of antenna ports comprises a set of antenna port pairs, and wherein each of the set of antenna port pairs is associated with a transmission direction.

12. The method of claim 4, wherein the one or more beam reference signals are frequency division multiplexed over a set of frequency tones.

13. The method of claim 1, wherein the one or more PBCH signals are pre-coded using space frequency block coding.

14. The method of claim 1, wherein the subframe is received using a millimeter wave (mmW) band.

15. The method of claim 1, further comprising:
performing an access procedure for a wireless network based at least in part on decoding the one or more PBCH signals.

16. A method of wireless communication comprising:
identifying a reference frequency tone of a set of frequency tones, wherein a plurality of frequency-band specific channel estimates are based at least in part on the reference frequency tone; and
transmitting a subframe comprising one or more beam reference signals and one or more physical broadcast channel (PBCH) signals over the set of frequency tones, wherein the subframe comprises information associating each beam reference signal to a respective antenna port, and wherein the one or more beam reference signals are configured to be used as a basis for the plurality of frequency-band specific channel estimates for decoding one or more PBCH signals.

17. The method of claim 16, wherein the subframe is a synchronization subframe comprising one or more synchronization signals.

18. The method of claim 16, wherein each of the one or more beam reference signals comprise a set of signals corresponding to a set of antenna ports.

19. The method of claim 18, wherein the one or more beam reference signals are code division multiplexed using a set of orthogonal cover codes over the set of frequency tones.

20. The method of claim 19,
wherein the set of orthogonal cover codes comprise a weight value of one for each of the set of antenna ports over the reference frequency tone, and the method further comprising:
identifying an additional reference frequency tone of the set of frequency tones, wherein the set of orthogonal cover codes comprise a weight value of one for a first half of the set of antenna ports and a weight value of negative one for a second half of the set of antenna ports over the additional reference frequency tone, and wherein the plurality of frequency-band specific channel estimates are based at least in part on the additional reference frequency tone.

21. The method of claim 20, wherein the reference frequency tone and the additional reference frequency tone are middle tones of the set of frequency tones.

22. The method of claim 18, wherein the set of antenna ports comprises a set of antenna port pairs, and wherein each of the set of antenna port pairs is associated with a transmission direction.

23. The method of claim 16, wherein the one or more beam reference signals are frequency division multiplexed over the set of frequency tones.

24. An apparatus for wireless communication comprising:
means for receiving a subframe comprising one or more beam reference signals and one or more physical broadcast channel (PBCH) signals over a set of frequency tones, wherein the subframe comprises information associating each beam reference signal to a respective antenna port of an associated base station;
means for identifying a reference frequency tone of the set of frequency tones;
means for determining a plurality of frequency-band specific channel estimates based at least in part on the one or more beam reference signals and the identified reference frequency tone; and
means for decoding one or more PBCH signals based at least in part on the plurality of frequency-band specific channel estimates.

25. The apparatus of claim 24, wherein the subframe is a synchronization subframe comprising one or more synchronization signals.

26. The apparatus of claim 25, wherein the one or more synchronization signals comprise a primary synchronization signal, a secondary synchronization signal, an extended synchronization signal, or any combination thereof.

27. The apparatus of claim 24, wherein each of the one or more beam reference signals comprise a set of signals corresponding to a set of antenna ports.

28. The apparatus of claim 27, wherein the one or more PBCH signals comprise a plurality of PBCH signals that are spatially multiplexed from each antenna port across a same set of resource elements.

29. The apparatus of claim 27, wherein the one or more beam reference signals are code division multiplexed using a set of orthogonal cover codes over the set of frequency tones, wherein each of the set of orthogonal cover codes is associated with an antenna port of the set of antenna ports.

30. The apparatus of claim 29, wherein the set of orthogonal cover codes is based at least in part on a Hadamard matrix or a DFT matrix.

31. The apparatus of claim 29,
wherein the set of orthogonal cover codes comprises a weight value of one for each of the set of antenna ports over the reference frequency tone, and the apparatus further comprising:
means for identifying an additional reference frequency tone of the set of frequency tones, wherein the set of orthogonal cover codes comprises a weight value of one for a first half of the set of antenna ports and a weight value of negative one for a second half of the set of antenna ports over the additional reference frequency tone, and wherein the plurality of frequency-band specific channel estimates are based at least in part on identifying the additional reference frequency tone.

32. The apparatus of claim 31, wherein the reference frequency tone and the additional reference frequency tone are middle tones of the set of frequency tones.

33. The apparatus of claim 24, wherein the one or more PBCH signals are pre-coded using space frequency block coding.

34. An apparatus for wireless communication comprising:
means for identifying a reference frequency tone of a set of frequency tones, wherein a plurality of frequency-band specific channel estimates are based at least in part on the reference frequency tone; and
means for transmitting a subframe comprising one or more beam reference signals and one or more physical broadcast channel (PBCH) signals over the set of frequency tones, wherein the subframe comprises information associating each beam reference signal to a respective antenna port, and wherein the one or more beam reference signals are configured to be used as a basis for the plurality of frequency-band specific channel estimates for decoding one or more PBCH signals.

35. The apparatus of claim 34, wherein the subframe is a synchronization subframe comprising one or more synchronization signals.

36. The apparatus of claim 34, wherein each of the one or more beam reference signals comprise a set of signals corresponding to a set of antenna ports.

37. The apparatus of claim 36, wherein the one or more beam reference signals are code division multiplexed using a set of orthogonal cover codes over the set of frequency tones.

38. The apparatus of claim 37,
wherein the set of orthogonal cover codes comprise a weight value of one for each of the set of antenna ports over the reference frequency tone, and the apparatus further comprising:
means for identifying an additional reference frequency tone of the set of frequency tones, wherein the set of orthogonal cover codes comprise a weight value of one for a first half of the set of antenna ports and a weight value of negative one for a second half of the set of antenna ports over the additional reference frequency tone, and wherein the plurality of frequency-band specific channel estimates are based at least in part on the additional reference frequency tone.

39. The apparatus of claim 38, wherein the reference frequency tone and the additional reference frequency tone are middle tones of the set of frequency tones.

40. An apparatus for wireless communication, comprising:
a processor;
memory in electronic communication with the processor; and
instructions stored in the memory and operable, when executed by the processor, to cause the apparatus to:
receive a subframe comprising one or more beam reference signals and one or more physical broadcast channel (PBCH) signals over a set of frequency tones, wherein the subframe comprises information associating each beam reference signal to a respective antenna port of an associated base station;
identify a reference frequency tone of the set of frequency tones;
determine a plurality of frequency-band specific channel estimates based at least in part on the one or more beam reference signal and the reference frequency tone; and
decode one or more PBCH signals based at least in part on the plurality of frequency-band specific channel estimates.

41. The apparatus of claim 40, wherein the subframe is a synchronization subframe comprising one or more synchronization signals.

42. The apparatus of claim 41, wherein the one or more synchronization signals comprise a primary synchronization signal, a secondary synchronization signal, an extended synchronization signal, or any combination thereof.

43. The apparatus of claim 40, wherein each of the one or more beam reference signals comprise a set of signals corresponding to a set of antenna ports.

44. The apparatus of claim 43, wherein the one or more PBCH signals comprise a plurality of PBCH signals that are spatially multiplexed from each antenna port across a same set of resource elements.

45. The apparatus of claim 43, wherein the one or more beam reference signals are code division multiplexed using a set of orthogonal cover codes over the set of frequency tones, wherein each of the set of orthogonal cover codes is associated with an antenna port of the set of antenna ports.

46. The apparatus of claim 45, wherein the set of orthogonal cover codes is based at least in part on a Hadamard matrix or a DFT matrix.

47. The apparatus of claim 45,
wherein the set of orthogonal cover codes comprises a weight value of one for each of the set of antenna ports over the reference frequency tone, and wherein the instructions are operable to cause the processor to:
identify an additional reference frequency tone of the set of frequency tones, wherein the set of orthogonal cover codes comprises a weight value of one for a first half of the set of antenna ports and a weight value of negative one for a second half of the set of antenna ports over the additional reference frequency tone, and wherein the plurality of frequency-band specific channel estimates are based at least in part on identifying the additional reference frequency tone.

48. The apparatus of claim 47, wherein the reference frequency tone and the additional reference frequency tone are middle tones of the set of frequency tones.

49. The apparatus of claim 47, wherein a horizontal polarization, a vertical polarization, or both for each of the set of antenna ports is associated with a transmission direction.

50. The apparatus of claim 43, wherein the set of antenna ports comprises a set of antenna port pairs, and wherein each of the set of antenna port pairs is associated with a transmission direction.

51. The apparatus of claim 43, wherein the one or more beam reference signals are frequency division multiplexed over the set of frequency tones.

52. The apparatus of claim 40, wherein the one or more PBCH signals are pre-coded using space frequency block coding.

53. The apparatus of claim 40, wherein the subframe is received using a millimeter wave (mmW) band.

54. The apparatus of claim 40, wherein the instructions are operable to cause the processor to:
perform an access procedure for a wireless network based at least in part on decoding the one or more PBCH signals.

55. The apparatus of claim 40, wherein the one or more PBCH signals are precoded for transmit diversity using space frequency block coding.

56. An apparatus for wireless communication, comprising:
a processor;
memory in electronic communication with the processor; and
instructions stored in the memory and operable, when executed by the processor, to cause the apparatus to:
identify a reference frequency tone of a set of frequency tones, wherein a plurality of frequency-band specific channel estimates are based at least in part on the reference frequency tone; and
transmit a subframe comprising one or more beam reference signals and one or more physical broadcast channel (PBCH) signals over the set of frequency tones, wherein the subframe comprises information associating each beam reference signal to a respective antenna port, and wherein the one or more beam reference signals are configured to be used as a basis for the plurality of frequency-band specific channel estimates for decoding one or more PBCH signals.

57. The apparatus of claim 56, wherein the subframe is a synchronization subframe comprising one or more synchronization signals.

58. The apparatus of claim 56, wherein each of the one or more beam reference signals comprise a set of signals corresponding to a set of antenna ports.

59. The apparatus of claim 58, wherein the one or more beam reference signals are code division multiplexed using a set of orthogonal cover codes over the set of frequency tones.

60. The apparatus of claim 59,
wherein the set of orthogonal cover codes comprise a weight value of one for each of the set of antenna ports over the reference frequency tone, and wherein the instructions are operable to cause the processor to:
identify an additional reference frequency tone of the set of frequency tones, wherein the set of orthogonal cover codes comprise a weight value of one for a first half of the set of antenna ports and a weight value of negative one for a second half of the set of antenna ports over the additional reference frequency tone, and wherein the plurality of frequency-band specific channel estimates are based at least in part on the additional reference frequency tone.

61. The apparatus of claim 60, wherein the reference frequency tone and the additional reference frequency tone are middle tones of the set of frequency tones.

62. The apparatus of claim 58, wherein the set of antenna ports comprises a set of antenna port pairs, and wherein each of the set of antenna port pairs is associated with a transmission direction.

63. The apparatus of claim 56, wherein the one or more beam reference signals are frequency division multiplexed over the set of frequency tones.

64. A non-transitory computer-readable medium storing code for wireless communication, the code comprising instructions executable to:
receive a subframe comprising one or more beam reference signals and one or more physical broadcast channel (PBCH) signals over a set of frequency tones, wherein the subframe comprises information associating each beam reference signal to a respective antenna port of an associated base station;
identify a reference frequency tone of the set of frequency tones;
determine a plurality of frequency-band specific channel estimates based at least in part on the one or more beam reference signals and the reference frequency tone; and
decode one or more PBCH signals based at least in part on the plurality of frequency-band specific channel estimates.

65. A non-transitory computer-readable medium storing code for wireless communication, the code comprising instructions executable to:
identify a reference frequency tone of a set of frequency tones, wherein a plurality of frequency-band specific channel estimates are based at least in part on the reference frequency tone; and
transmit a subframe comprising one or more beam reference signals and one or more physical broadcast channel (PBCH) signals over the set of frequency tones, wherein the subframe comprises information associating each beam reference signal to a respective antenna port, and wherein the one or more beam reference signals are configured to be used as a basis for the plurality of frequency-band specific channel estimates for decoding one or more PBCH signals.

66. The method of claim 1, wherein a first frequency-band specific channel estimate of the plurality of frequency-band specific channel estimates is determined based at least in part on at least one frequency tone of the set of tones different from one or more frequency tones of the set of tones for a second frequency-band specific channel estimate of the plurality of frequency-band specific channel estimates.

\* \* \* \* \*